US012596002B2

(12) United States Patent  (10) Patent No.: US 12,596,002 B2
Butter et al.  (45) Date of Patent: Apr. 7, 2026

(54) METROLOGY APPARATUS

(71) Applicant: RENISHAW PLC, Wotton-under-Edge (GB)

(72) Inventors: Andrew Geoffrey Butter, Wotton-under-Edge (GB); Benjamin George Hoy, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 343 days.

(21) Appl. No.: 18/277,661

(22) PCT Filed: Feb. 16, 2022

(86) PCT No.: PCT/GB2022/050409
§ 371 (c)(1),
(2) Date: Aug. 17, 2023

(87) PCT Pub. No.: WO2022/175653
PCT Pub. Date: Aug. 25, 2022

(65) Prior Publication Data
US 2024/0159508 A1  May 16, 2024

(30) Foreign Application Priority Data

Feb. 17, 2021  (GB) ...................................... 2102199
Feb. 17, 2021  (GB) ...................................... 2102200
Feb. 17, 2021  (GB) ...................................... 2102201

(51) Int. Cl.
*G01B 21/04* (2006.01)
*G01B 5/008* (2006.01)
(Continued)

(52) U.S. Cl.
CPC ........... *G01B 21/047* (2013.01); *G01B 5/008* (2013.01); *G01B 5/14* (2013.01); *G01B 11/005* (2013.01); *G01B 11/14* (2013.01); *G01D 11/30* (2013.01)

(58) Field of Classification Search
CPC ...... G01B 21/04; G01B 21/047; G01B 5/008; G01B 5/14; G01B 11/005; G01B 11/14; G01D 11/30
(Continued)

(56) References Cited

U.S. PATENT DOCUMENTS 4,888,877 A * 12/1989 Enderle .................. G01B 5/012
33/561
5,028,901 A  7/1991 Enderle et al.
(Continued)

FOREIGN PATENT DOCUMENTS

DE  19607680 A1  9/1996
EP  0 637 729 A2  2/1995
(Continued)

OTHER PUBLICATIONS

May 19, 2022 International Search Report issued in International Patent Application No. PCT/GB2022/050412.
(Continued)

*Primary Examiner* — John Fitzgerald
*Assistant Examiner* — Daniel M Quinn
(74) *Attorney, Agent, or Firm* — Oliff PLC

(57) ABSTRACT

A metrology apparatus includes an indexed articulated joint including: first and second relatively reorientable bodies, respectively having mutually engageable engagement elements, which can be locked together in different angular orientations about a first axis to provide a plurality of angularly indexed positions of the bodies; at least one verification sensor configured to provide a measure of the
(Continued)

relative spatial configuration of bodies when in their locked state; and wherein the apparatus is configured such that when the bodies lock together at an indexed position, the sensor measures the relative spatial configuration of the bodies, and wherein information obtained from the measure is compared to calibration information obtained from at least one other measure of the relative spatial configuration of the bodies when the bodies were locked at said indexed position at an earlier point in time, in order to establish information about the state of engagement of the bodies.

23 Claims, 11 Drawing Sheets

(51) Int. Cl.

| | |
|---|---|
| *G01B 5/14* | (2006.01) |
| *G01B 11/00* | (2006.01) |
| *G01B 11/14* | (2006.01) |
| *G01D 11/30* | (2006.01) |

(58) Field of Classification Search
USPC ......... 33/700, 701, 710, 711, 712, 714, 728, 33/734, 735, 736, 737
IPC ..................... G01B 11/00,11/14, 21/04, 5/14
See application file for complete search history.

(56) References Cited

U.S. PATENT DOCUMENTS

| | | | | |
|---|---|---|---|---|
| 5,084,981 | A | 2/1992 | McMurtry et al. | |
| 5,185,936 | A | 2/1993 | McMurtry | |
| 5,404,650 | A | 4/1995 | Lindner | |
| 5,435,072 | A | 7/1995 | Lloyd et al. | |
| 5,526,576 | A * | 6/1996 | Fuchs .................... | G01B 21/04 33/503 |
| RE35,510 | E | 5/1997 | McMurtry | |
| 5,735,180 | A | 4/1998 | McMurtry | |
| 6,134,506 | A * | 10/2000 | Rosenberg ........... | G01B 21/042 33/502 |
| 6,170,358 | B1 | 1/2001 | Hunter et al. | |
| 6,198,298 | B1 | 3/2001 | Nishioki | |
| 6,249,985 | B1 | 6/2001 | Piko et al. | |
| 6,430,833 | B1 | 8/2002 | Butter et al. | |
| 6,546,643 | B2 | 4/2003 | Lotze et al. | |
| 6,772,527 | B1 | 8/2004 | Butter et al. | |
| 6,854,195 | B2 | 2/2005 | Jordil et al. | |
| 6,907,673 | B2 | 6/2005 | Zanier et al. | |
| 6,938,353 | B2 | 9/2005 | Rouge et al. | |
| 7,036,239 | B2 | 5/2006 | Jordil et al. | |
| 7,076,883 | B2 | 7/2006 | Yamamoto et al. | |
| 7,155,839 | B2 | 1/2007 | Schopf | |
| 7,213,344 | B2 | 5/2007 | Jordil et al. | |
| 7,213,345 | B2 | 5/2007 | Jordil et al. | |
| 7,263,780 | B2 | 9/2007 | Jordil et al. | |
| 7,350,310 | B2 | 4/2008 | Lloyd et al. | |
| 7,568,373 | B2 * | 8/2009 | McMurtry ........... | G01B 21/042 73/1.81 |
| 7,743,524 | B2 | 6/2010 | Eaton et al. | |
| 8,001,859 | B2 | 8/2011 | McMurtry et al. | |
| RE43,250 | E | 3/2012 | Lloyd et al. | |
| 8,127,458 | B1 | 3/2012 | Ferrari | |
| 8,312,635 | B2 | 11/2012 | Jordil et al. | |
| 8,479,403 | B2 | 7/2013 | Jordil et al. | |
| 8,939,008 | B2 | 1/2015 | McMurtry et al. | |
| 9,038,282 | B2 | 5/2015 | McMurtry et al. | |
| 9,377,284 | B2 | 6/2016 | McMurtry et al. | |
| 9,429,416 | B2 | 8/2016 | Kocic et al. | |
| 9,494,403 | B2 | 11/2016 | Rouge et al. | |
| 9,689,663 | B2 | 6/2017 | Nagataki et al. | |
| 9,952,044 | B2 * | 4/2018 | Gatton ................. | G01B 21/042 |
| 10,197,375 | B2 | 2/2019 | Sakai | |
| 10,267,629 | B2 | 4/2019 | Thys et al. | |
| 10,527,411 | B2 | 1/2020 | Wooldridge et al. | |
| 10,627,259 | B2 * | 4/2020 | Rees .................... | G01B 11/007 |
| 10,794,678 | B2 | 10/2020 | Brenner et al. | |
| 10,969,760 | B2 | 4/2021 | Lankalapalli et al. | |
| 11,235,469 | B2 | 2/2022 | Horiguchi et al. | |
| 11,644,298 | B2 | 5/2023 | Hamner | |
| 12,076,859 | B2 | 9/2024 | Muthukamatchi et al. | |
| 12,359,901 | B2 | 7/2025 | Konrad et al. | |
| 2001/0025427 | A1 | 10/2001 | Lotze et al. | |
| 2004/0103547 | A1 * | 6/2004 | Raab ..................... | B23Q 35/04 33/503 |
| 2004/0149057 | A1 | 8/2004 | Jordil et al. | |
| 2004/0154177 | A1 | 8/2004 | Jordil et al. | |
| 2005/0256672 | A1 | 11/2005 | McMurtry et al. | |
| 2006/0005633 | A1 | 1/2006 | Jordil et al. | |
| 2006/0112576 | A1 | 6/2006 | Lu | |
| 2006/0112578 | A1 | 6/2006 | Jordil et al. | |
| 2006/0112579 | A1 | 6/2006 | Jordil et al. | |
| 2006/0196066 | A1 | 9/2006 | Lloyd et al. | |
| 2006/0266100 | A1 * | 11/2006 | McMurtry ............... | G01B 3/30 73/866.5 |
| 2006/0283034 | A1 | 12/2006 | McMurtry et al. | |
| 2008/0256814 | A1 | 10/2008 | Pettersson | |
| 2010/0005852 | A1 | 1/2010 | McMurtry et al. | |
| 2011/0258868 | A1 * | 10/2011 | Jordil ..................... | G01B 5/012 33/503 |
| 2011/0277534 | A1 | 11/2011 | McMurtry et al. | |
| 2014/0236520 | A1 * | 8/2014 | Engel ................... | G01B 21/042 702/95 |
| 2015/0176958 | A1 * | 6/2015 | Rouge ................... | G01B 5/012 33/503 |
| 2017/0167843 | A1 | 6/2017 | Antreasyan et al. | |
| 2018/0172442 | A1 * | 6/2018 | Thys ..................... | G01R 1/067 |
| 2019/0003813 | A1 * | 1/2019 | Ruck ..................... | G01B 5/012 |
| 2022/0137005 | A1 * | 5/2022 | Hall ..................... | G01N 29/221 73/632 |
| 2022/0349705 | A1 * | 11/2022 | Harsila ................ | G01M 11/025 |
| 2022/0390227 | A1 * | 12/2022 | Kasahara ............. | G01B 21/042 |
| 2023/0184531 | A1 * | 6/2023 | Konrad .................. | G01B 5/008 |
| 2024/0093987 | A1 * | 3/2024 | Aebischer ........... | G01B 21/045 |
| 2024/0133685 | A1 * | 4/2024 | Butter ................... | G01B 5/008 |
| 2024/0230325 | A9 * | 7/2024 | Butter ................. | G01B 21/047 |
| 2024/0318947 | A1 * | 9/2024 | Hoy ....................... | G01B 5/008 |

FOREIGN PATENT DOCUMENTS

| | | | | |
|---|---|---|---|---|
| EP | | 1443302 | A2 | 8/2004 |
| EP | | 1 844 371 | B1 | 3/2013 |
| EP | | 2 889 573 | A1 | 7/2015 |
| EP | | 3 333 537 | A1 | 6/2018 |
| JP | | H05-248808 | A | 9/1993 |
| JP | | 3550405 | B2 | 8/2004 |
| JP | | 2013-169619 | A | 9/2013 |
| JP | | 2017-514119 | A | 6/2017 |
| JP | | 2018-532954 | A | 11/2018 |
| JP | | 2019-534060 | A | 11/2019 |
| WO | | 2005/028996 | A1 | 3/2005 |
| WO | | 2005/050134 | A1 | 6/2005 |
| WO | | 2006/079794 | A1 | 8/2006 |
| WO | WO-2011042124 | A1 * | 4/2011 | ............. G01B 7/012 |
| WO | | 2012/010836 | A2 | 1/2012 |
| WO | | 2012/086055 | A1 | 6/2012 |
| WO | | 2022/175653 | A1 | 8/2022 |

OTHER PUBLICATIONS

May 19, 2022 Written Opinion issued in International Patent Application No. PCT/GB2022/050412.
Nov. 10, 2021 Search Report issued in British Patent Application No. 2102201.7.
Nov. 10, 2021 Search Report issued in British Patent Application No. 2102200.9.
Nov. 10, 2021 Search Report issued in British Patent Application No. 2102199.3.
Braddick, H.J.J., "Mechanical Design of Laboratory Apparatus", Chapman and Hall Limited, London, 1960, pp. 5-31.

(56)　　　　References Cited

OTHER PUBLICATIONS

May 18, 2022 International Search Report issued in International Patent Application No. PCT/GB2022/050409.
May 18, 2022 Written Opinion issued in International Patent Application No. PCT/GB2022/050409.
Jun. 2, 2022 International Search Report issued in International Patent Application No. PCT/GB2022/050419.
Jun. 2, 2022 Written Opinion issued in International Patent Application No. PCT/GB2022/050419.
U.S. Appl. No. 18/277,697, filed Aug. 17, 2023 in the name of Benjamin George Hoy et al.
U.S. Appl. No. 18/277,628, filed Aug. 17, 2023 in the name of Andrew Geoffrey Butter et al.
Sep. 27, 2023 Written Opinion of the International Searching Authority issued in International Patent Application No. PCT/GB2023/052057.
Jan. 31, 2023 Extended Search Report issued in European Patent Application No. 22275107.5.
Sep. 27, 2023 International Search Report issued in International Patent Application No. PCT/GB2023/052057.
U.S. Appl. No. 19/100,896, filed Feb. 3, 2025 in the name of Andrew Geoffrey Butter et al.
Braddick, H. J. J., "Mechanical Design of Laboratory Apparatus," Institute of Physics, Chapman and Hall, Limited, London, 1960, pp. 11-30.
U.S. Appl. No. 19/100,896, filed Feb. 3, 2025 in the name of Butter et al.
Oct. 10, 2025 Notice of Allowance issued in U.S. Appl. No. 18/277,628.
"Curvic Coupling Design," http://geartechnology.com/issues/1186x/Back-to-Basics.pdf Gleason Works, (2020), pp. 34-48.
Hexagon Manufacturing Intelligence, "HH-A-T2.5 / HH-AS-T2.5 Automatic 2.5° Probe Heads HH-A-T2.5 and HH-AS-T2.5 -A new degree of freedom," http://www.hexagonmi.com, (2020), pp. 1-4.
"Hirth Joint," Wikipedia https://en.wikipedia.org/wiki/Hirth_joint, (Sep. 2020) pp. 1-3.
"List of gear nomenclature," Wikipedia htts://en.wikipedia.org/wiki/List_of_gear_nomenclature#Face_gear, (Sep. 2020), pp. 1-26.
"Renishaw RX-10 Technical Drawings," (2018), pp. 1-2.
"System comparison RX10 vs XR20-W," Renishaw apply innovation, (2018), 2 pages.

* cited by examiner

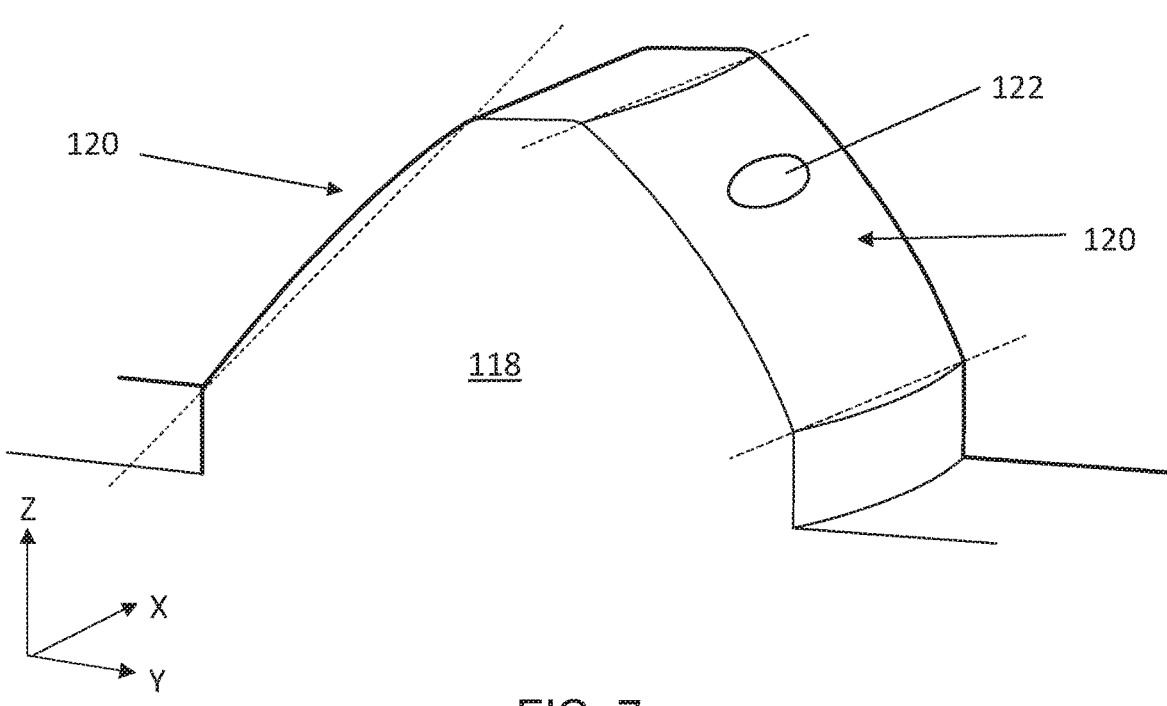
FIG. 7a
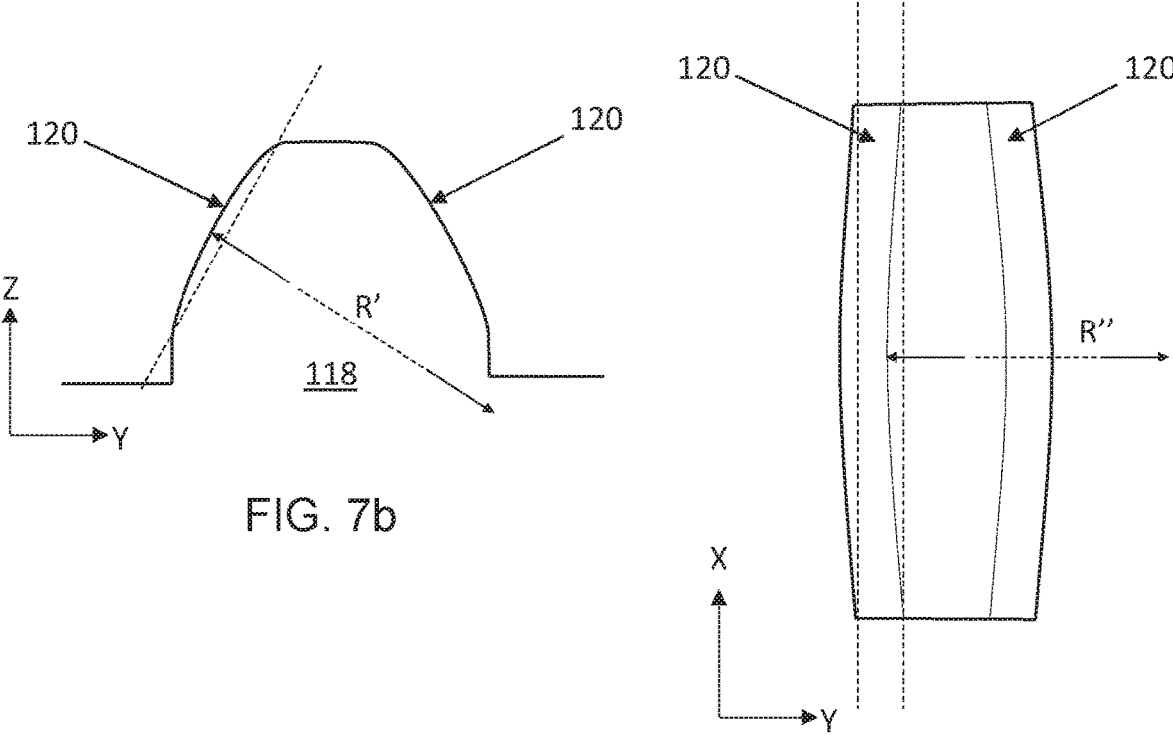
FIG. 7b
FIG. 7c

METROLOGY APPARATUS

The present invention relates to an indexed articulated joint, in particular one used in a metrology apparatus. For example, the invention relates to an indexed articulated joint for an articulated head which is configured to support a measurement probe on a coordinate positioning apparatus such that the measurement probe can be arranged at a plurality of different rotational orientations.

As is well known in the field of coordinate positioning apparatus, in particular in the field of coordinate measuring machines (CMMs), an articulated head (or rotary table) for a measurement probe (or object) comprises articulatable members which facilitate reorientation of a measurement probe (or object) mounted thereon about at least one axis of rotation. Typically, an articulated head will provide two orthogonal axes of rotation, although it is possible that fewer or more axes of rotation are provided. Typically a rotary table will provide one axis of rotation.

U.S. Pat. No. 5,185,936 describes an articulated head with one axis of rotation and EP2889573 and WO2006/079794 describe articulated heads which provide two orthogonal axes of rotation. As described in these documents, it is also known to provide articulated heads with an indexing mechanism which enable the relatively rotatable parts of the articulated head to be locked into a defined, indexed position. Indexing mechanisms can be provided by providing two sets of intermeshing members, one on each of the relatively rotatable members. When the intermeshing members are engaged, they lock so as to present relative rotation of the rotatable members. When the intermeshing members are disengaged, the rotatable members are free to rotate relative to each other such that they (and a measurement probe mounted thereon) can be repositioned to a new orientation before being reengaged so as to lock the rotatable members (and a measurement probe mounted thereon) at the new orientation. A measurement operation can then take place with the measurement probe being held at a defined, known, rotational orientation.

The present invention relates to an improved articulated apparatus.

According to a first aspect of the invention there is provided a metrology apparatus comprising an indexed articulated joint comprising: first and second bodies respectively having mutually engageable engagement elements, which can be locked together in a plurality of different angular orientations about a first axis so as to provide a plurality of angularly indexed positions at which the first and second bodies can be locked relative to each other; at least one verification sensor configured to provide a measure of the relative spatial configuration of first and second bodies when in their locked state, and wherein the apparatus is configured such that in the event of the first and second bodies locking together at an indexed position, the verification sensor is used to measure the relative spatial configuration of the first and second bodies, and wherein information obtained from said measure is compared to calibration information which was obtained from at least one other (in other words previous) measure of the relative spatial configuration of the first and second bodies (e.g. taken by the verification sensor) when the first and second bodies were locked at said indexed position at an earlier point in time (in other words, when the first and second bodies were previously locked at said indexed position), in order to establish information about the state of engagement of the first and second bodies.

An apparatus configured in accordance with this first aspect of the invention can help to verify that the first and second bodies have locked together properly; for instance to verify that they have locked together at substantially the same relative configuration as at a previous/earlier point in time, e.g. during a calibration stage. Accordingly, an apparatus configured in accordance with this first aspect of the invention can help to verify the repeatability of the indexed position at which the first and second bodies are locked together.

The apparatus can be configured to react in a predetermined manner depending on the outcome of the comparison. For instance, if the comparison indicates that the first and second bodies have not properly locked together, the apparatus can be configured to react by causing the first and second bodies to unlock and relock at the same indexed position. Optionally, this can comprise relocking the first and second bodies from a slightly different position (e.g. from a slightly different relative rotational orientation). Reacting in a predetermined manner could additionally or alternatively comprise logging and/or reporting (e.g. outputting to a controller device) an error or warning state.

As will be understood, references to "previous measure" and "previously locked at said indexed position" does not necessarily mean the latest, or most recent measurement, or the latest or most recent time they were locked at said indexed position. Rather, the terms "previous" and "previously" are used to mean at some earlier point in time. Accordingly, the first and second bodies might have been locked at said indexed position a number of times between the current time and the time at which the calibration information was obtained.

Preferably, the calibration information was obtained from at least one other measure of the relative spatial configuration of the first and second bodies taken by the at least one verification sensor (when the first and second bodies were locked at said indexed position at an earlier point in time).

The at least one verification sensor could be configured to measure the relative spatial configuration of the first and second bodies in only one dimension, for example at least two orthogonal dimensions, for instance three orthogonal dimensions. The verification sensor could be configured to measure the relative height/separation (e.g. along axis of rotation) of the first and second bodies.

Optionally, the verification sensor can be configured to measure the relative configuration (e.g. lateral position and/or rotational orientation) of the first and second bodies in a plane which is perpendicular to the axis of rotation (i.e. the first axis). For instance, the verification sensor could be configured to measure the relative lateral position of the first and second bodies (e.g. in at least one dimension which is perpendicular to the axis of rotation, for example in two orthogonal dimensions, which are perpendicular to the axis of rotation). Optionally, the verification sensor can be configured to measure the relative rotational orientation of the first and second bodies about the first axis. Optionally, the at least one verification sensor can be configured to measure a combination of the above-mentioned relative configurations.

As will be understood, the at least one verification sensor can be configured to provide a measure of the relative configuration of the first and second bodies (in a plane which is perpendicular to the axis of rotation) at a resolution finer than the indexing increment of the engagement elements, for example to a resolution least 5 times the indexing increment of the engagement elements, optionally at least 10 times the indexing increment of the engagement elements, for example at least 15 times the indexing increment of the engagement elements. Preferably, the verification sensor enables the relative position of the first and second bodies to be established to within 50 μm, for example to within 10 μm, optionally to within 1 μm.

The apparatus can be configured such that it is determined that the first and second bodies have not locked properly together if the comparison indicates that the current relative spatial configuration of the first and second bodies in the indexed position differs from a relative spatial configuration of the first and second bodies represented by the calibration information, by more than a predetermined threshold. The predetermined threshold could be not more than 100 μm (mircons), for instance not more than 50 μm, optionally not more 20 μm, but could for instance be a small as not more than 1 μm, for instance not more than 100 nm (nanometres), not more than 50 nm, or not more than 10 nm.

Preferably, the verification sensor comprises an encoder apparatus. The encoder apparatus can comprise a rotary scale provided on one of the first and second bodies, and at least one first readhead provided on the other of the first and second bodies to read the rotary scale. It can be preferable that the verification sensor's encoder apparatus comprises a second readhead provided to read the scale. It can be preferable that the second readhead provided is configured to read the scale at a location which is less than 180° apart from the location at which the at least one first readhead reads the scale, for instance, at a location which is between 45° and 135° from the from the location at which the at least one first readhead reads the scale, and preferably at a location which is approximately 90° apart from the location at which the at least one first readhead reads the scale. Accordingly, in embodiments in which the verification sensor comprises at least first and second readheads, the apparatus could be configured such that in the event of the first and second bodies locking together at an indexed position, the first and second readheads are used to read the scale, and first and second readings obtained respectively from the first and second readheads are compared to respective first and second readings which were obtained by the first and second readheads when the first and second bodies were locked at said indexed position at an earlier point in time, in order to establish information about the state of engagement of the first and second bodies.

The verification sensor's encoder apparatus can comprise an incremental encoder apparatus comprising an incremental scale having a series of periodic scale features. In particular, the verification sensor's encoder apparatus can comprise an optical encoder apparatus.

The engagement elements of the first and second bodies could be dis-engageable by axial relative movement of the first and second bodies along the first axis in a first direction such that the first and second bodies can be unlocked and relatively rotated about the first axis, and re-engageable by axial relative movement of the first and second bodies along the axis in a second direction.

The apparatus can further comprise a motor for driving the first and second bodies about the first axis when unlocked.

The apparatus can further comprise a primary encoder apparatus configured to monitor the relative rotational position of the first and second bodies about the first axis when unlocked. Optionally, this could be same encoder apparatus as the verification sensor's encoder apparatus. Optionally, the primary encoder apparatus could share some common parts with the verification sensor's encoder apparatus (e.g. they could share the same scale, with the primary encoder apparatus comprising a different readhead to the readhead of the verification sensor). However, it can be preferred that the primary encoder apparatus is an entirely different encoder apparatus to the verification sensor's encoder apparatus, comprising a different readhead and a different scale.

The apparatus can comprise a motor mechanism for actuating the first and second bodies between their locked and/or unlocked states (a "locking/unlocking" motor mechanism). The locking/unlocking motor mechanism can comprise a member (e.g. prop), actuatable by a motor so as to disengage the mutually engageable engagement elements of the first and second bodies along the first axis. For example, the prop could be actuatable between a retracted configuration at which the first and second bodies are in their locked state, and an extended configuration at which the first and second bodies are held apart by the prop along the first axis such that the mutually engageable engagement elements are unlocked thereby permitting relative rotation of the first and second bodies. For instance, the first body could comprise the prop, and the prop and the second body could be magnetically biased toward each other so as to magnetically retain the first and second bodies. A supplemental bias member (e.g. magnetic material) could be configured to bias the prop towards its retracted configuration.

For example, the first body could comprise a member (e.g. a prop) which, at least when in the unlocked configuration. is relatively rotatable with respect to the first body about the first axis, and is configured to engage and be rotationally fixed relative to the second body when the first and second bodies are unlocked and rotated relative to each other (such that the relative rotational position of the first and second bodies about the first axis can thereby be determined). The member could be actuatable (e.g. by a motor) between a retracted configuration at which the first and second bodies are in their locked state, and an extended configuration at which the first and second bodies are held apart by the member/prop along the first axis such that the first and second bodies are unlocked thereby permitting relative rotation of the first and second bodies. The primary encoder apparatus could comprise a readhead on one of the first body and the member, and a scale on the other, such that the readhead provides a measurement of the relative rotational position of the first body and the member. The apparatus could be configured to control the rotation of the first and second bodies when unlocked using the output of the primary encoder apparatus. The prop could be coupled to the second body (e.g. via corresponding engagement features as described in more detail below) when in its extended configuration and decoupled from the second body when in its retracted configuration.

The metrology apparatus could comprise a rotary table, comprising the indexed articulated joint, on which a workpiece to be inspected is mounted. The metrology apparatus can comprise a probe head comprising the indexed articulated joint. The probe head could be configured to support a measurement probe on a coordinate positioning apparatus such that the measurement probe can be arranged at a plurality of different indexed rotational orientations. Suitable measurement probes include contact and non-contact measurement probes. Suitable measurement probes include probes for measuring the dimensions of a workpiece. Suitable measurement probes include touch-trigger and also scanning or "analogue" measurement probes.

The metrology apparatus (e.g. rotary table/probe head) could be configured to be mounted on a positioning apparatus, in particular a coordinate positioning apparatus, for example a coordinate measuring machine (CMM). The metrology apparatus (e.g. rotary table/probe head) could be mounted on a positioning apparatus which is configured to facilitate repositioning of the metrology apparatus in at least two, for example, three orthogonal linear degrees of freedom. The metrology apparatus (e.g. rotary table/probe head) could be removably mounted to the positioning apparatus (e.g. to a z-column or a quill of a CMM) via one or more releasable fasteners, such as one or more bolts.

The apparatus can comprise a memory device comprising the calibration information. The memory device could be located in a part of the apparatus separate from the indexed articulated joint (e.g. within a controller). Preferably, a part of the indexed articulated joint (e.g. the first or second body) comprises the memory device. In embodiments in which the apparatus comprises a probe head (or a rotary table), the probe head (or the rotary table) could comprise the memory device.

The apparatus could comprise a processing device configured to perform the aforementioned comparison. The processing device could be located in a part of the apparatus separate from the indexed articulated joint (e.g. within a controller). Optionally, a part of the indexed articulated joint (e.g. the first or second body) comprises the processing device. In embodiments in which the apparatus comprises a probe head (or a rotary table), the probe head (or the rotary table) could comprise the processing device.

Accordingly, the apparatus can be configured such that the aforementioned comparison is performed within the part of the metrology apparatus which comprises the indexed articulated joint itself (e.g. within the probe head or rotary table).

The calibration information could be stored in a look-up table. Optionally, the calibration information could be represented by a function. Accordingly, the aforementioned memory device could comprise a look-up table and/or a function containing/representing the calibration information. A look-up table could comprise calibration information for each of at least a subset of the possible indexed positions of the first and second bodies. A look-up table could comprise calibration information for each of the possible indexed positions of the first and second bodies. For instance, the look-up table could comprise at least one element/data-cell for each indexed position. Each element/data-cell can comprise calibration information for the indexed position the element/data-cell is associated with. The look-up table could comprise multiple elements/data-cells for each indexed position. This could be helpful in the event that there is more than one verification sensor, or the verification sensor can provide multiple outputs/readings/measures of the relative position of the first and second bodies (e.g. as per the above and below described embodiments of the verification sensor comprising an encoder apparatus comprising at least two readheads).

The "information obtained from said measure" and the "calibration information" could comprise relative position information (e.g. as opposed to absolute position information).

As mentioned above, the verification sensor could comprise an encoder apparatus (e.g. a scale on one of the first and second bodies and one or more readheads on the other of the first and second bodies, the one or more readheads outputting signals which are dependent on the relative position of the scale and readhead(s)). As will be understood, a scale can comprise a series of features, for example a series of generally periodic features. A scale can have a characteristic pitch distance (or "characteristic pitch angle" for some rotary systems, e.g. disc scale on which scale features are radially arranged). Readhead signals can also be used to interpolate between scale pitch intervals to produce position measurements which have a much higher resolution than the scale pitch. (There are cases where the readhead produces a spatially periodic signal, and in some embodiments the readhead's signal period has a higher frequency (shorter wavelength) than the scale period. In these cases interpolation can still be used to produce position measurements which have a much higher resolution than signal period). Accordingly, the "information obtained from said measure" and the "calibration information" could comprise relative position information at a resolution much finer than the period of the scale. Such relative position information could be referred to as a "phase reading"; because the information relates to the "phase" position between the scale's periodic features. Accordingly, the "information obtained from said measure" and the "calibration information" could comprise phase readings. Accordingly, in such an embodiment, the apparatus could be configured such that in the event of the first and second bodies locking together at an indexed position, a readhead mounted on one of the first and second bodies is configured to read a scale mounted on the other of the first and second bodies, and a phase reading obtained therefrom is compared to a phase reading which was obtained by the readhead when the first and second bodies were locked at said indexed position at an earlier point in time, in order to establish information about the state of engagement of the first and second bodies.

Accordingly, in embodiments in which the verification sensor comprises at least first and second readheads, the apparatus could be configured such that in the event of the first and second bodies locking together at an indexed position, the first and second readheads are configured to read the scale, and first and second phase readings obtained respectively from the first and second readheads are compared to respective first and second phase readings which were obtained by the first and second readheads when the first and second bodies were locked at said indexed position at an earlier point in time, in order to establish information about the state of engagement of the first and second bodies.

The calibration information (e.g. the lookup table or function) could be updated over time. This could happen continuously or at regular intervals. This could be done as part of a dedicated calibration process, or it could be done during measurement operations. For example, each time the first and second bodies lock together at any given indexed position and the comparison indicates that the first and second bodies have properly locked together (e.g. the comparison indicates that the current relative spatial configuration of the first and second bodies in the indexed position does not differ from a relative spatial configuration of the first and second bodies represented by the calibration information, by more than a predetermined threshold), the information obtained from the measure provided by the verification sensor of the current relative spatial configuration of the first and second bodies reading output by the first 160 and second (not shown) readheads could be used to update (e.g. could be stored) the calibration information (e.g. could be used to update/replace the information stored in the particular element/data-cell in the look-up table that is associated with the indexed position).

As will be understood, "information obtained from said measure" could mean that the information is obtained from the measurement obtained by the verification sensor by itself, or could mean that the information is obtained from the measurement obtained by the verification sensor and also from other sources of data too. Accordingly, the information need not necessarily be, or only be obtained/derived from, the measurement obtained by the verification sensor. Nevertheless, it could be preferred that the "information at least derived from said current measure" is just the measurement obtained by the verification sensor. Accordingly, the "information obtained from said measure" could be the measurement obtained by the verification sensor, e.g. it could be just the output from the verification sensor.

Likewise, the "calibration information which was obtained from at least one other/previous measure of the relative spatial configuration of the first and second bodies" could mean that the calibration information is obtained from at least one other/previous measurement obtained by the verification sensor by itself, or could mean that the calibration information is obtained from the at least one other/previous measurement obtained by the verification sensor and also from other sources of data too. Accordingly, the calibration information need not necessarily be, or only be obtained/derived from, the at least one other/previous measurement obtained by the verification sensor. Nevertheless, it could be preferred that the "calibration information" is just a measurement obtained by the verification sensor at an earlier point in time. Accordingly, the "calibration information" could be a measurement obtained by the verification sensor, e.g. it could be just the output from the verification sensor.

Accordingly, the apparatus could be configured to compare a current measure of the relative spatial configuration of the first and second bodies obtained by the verification sensor, with an other/previous measure of the relative spatial configuration of the first and second bodies taken by the verification sensor when the first and second bodies were locked at said indexed position at an earlier point in time, in order to establish information about the state of engagement of the first and second bodies.

As will be understood, the mutually engageable engagement elements can provide a plurality of predetermined angularly indexed positions at which the first and second bodies can be locked relative to each other. The mutually engageable engagement elements/indexing mechanism can provide for an indexing increment of 10° or less, for instance an indexing increment of 5° or less, for example 4° or less. The mutually engageable engagement elements/indexing mechanism can provide for an indexing increment of at least 0.5°, for instance at least 1°. For example, the mutually engageable engagement elements/indexing mechanism can provide for an indexing increment of about 2.5°.

The apparatus can comprise a motor configured to drive the first and second bodies about the axis of rotation (the first axis) when the first and second bodies are unlocked (a "re-orientation" motor mechanism).

As will be understood, the mutually engageable engagement elements/indexing mechanism can comprise two sets of intermeshing members/features, one on each of the first and second bodies. The mutually engageable engagement elements/indexing mechanism can comprise, for instance, an annular series of features, for example a series of balls, or a series of tapered teeth (e.g. providing a face spline member) on one of the first and second bodies (e.g. on the first body). The other of the first and second bodies (e.g. the second body) could also comprise an annular series of features, although it can be preferred that the engagement elements of the other of the first and second bodies (e.g. the second body) are configured, such that when in the locked state, they engage with only a subset of the series of teeth of the annular series of features on said one of the first and second bodies (e.g. on the first body) at a plurality of discrete, annularly-spaced, locations. The apparatus can be configured such that when in the locked state (and for each of the possible indexed positions), the engagement elements provided on the other of the first and second bodies engage with a subset of the series of teeth of said one of the first and second bodies at three discrete, equiangularly-spaced, locations.

The apparatus can be configured such that when in the locked state (and for each of the possible indexed positions), the mutually engageable engagement elements provide for a kinematic mount/location/connection between the first and second bodies. As will be understood a kinematic mount is one which has elements on one part which are arranged to cooperate with elements on another part to provide highly repeatable positioning. The elements are arranged to cooperate with each other so as to constrain relative movement between the parts in all six degrees of freedom (i.e. three perpendicular linear degrees of freedom and three perpendicular rotational degrees of freedom) preferably by six points of contact or constraints. In one particular embodiment, the elements on one of the parts can be arranged to provide a pair of mutually converging surfaces at each of three spaced locations, in such a manner as to provide a total of six points of contact with the elements on the other part. This constrains the six possible degrees of freedom of one part relative to the other. Such a kinematic mount is sometimes known as a Boys support, and is described in, for example, H. J. J. Braddick, "Mechanical Design of Laboratory Apparatus", Chapman and Hall, London, 1960, pages 11-30. Further details of example configurations for providing such kinematic mount/location/connection is provided below.

The apparatus can comprise a third body, wherein the third body and one of the first and second bodies have mutually engageable engagement elements, which can be locked together in a plurality of different angular orientations about a second axis so as to provide a plurality of angularly indexed positions at which the third and said first or second bodies can be locked relative to each other. The features described above in connection with the first and second bodies are equally applicable to the third body and the first or second body to which it is reorientably mounted to via said mutually engageable engagement elements. Accordingly, there can be provided at least one verification sensor configured to provide a measure of the relative spatial configuration of third and the first or second body to which it is reorientably mounted to via said mutually engageable engagement elements, and the apparatus can be configured such that in the event of the third and the first or second bodies locking together at an indexed position, the verification sensor is used to measure the relative spatial configuration of the third and first or second bodies, and wherein information obtained from said measure is compared to calibration information which was obtained from at least one other/previous measure of the relative spatial configuration of the third and first or second bodies taken by the verification sensor when the third and first or second bodies were locked at said indexed position at an earlier point in time, in order to establish information about the state of engagement of the third and first or second bodies.

According to another aspect of the invention there is provided a metrology apparatus comprising an indexed articulated joint, comprising: first and second bodies respectively having mutually engageable engagement elements, which can be locked together in a plurality of different angular orientations about a first axis so as to provide a plurality of angularly indexed positions at which the first and second bodies can be locked relative to each other; at least one verification sensor configured to provide an output which is dependent on the relative spatial configuration of first and second bodies in their locked state, and a memory device comprising predetermined calibration information for each of at least a subset of the indexed positions, obtained from the output of the at least one verification sensor.

According to another aspect of the invention there is provided a metrology apparatus comprising an indexed articulated joint comprising: first and second bodies respectively having mutually engageable engagement elements, which can be locked together in a plurality of different angular orientations about a first axis so as to provide a plurality of angularly indexed positions at which the first and second bodies can be locked relative to each other; the engagement elements of the first and second bodies being dis-engageable by axial relative movement of the first and second bodies along the first axis in a first direction such that the first and second bodies can be unlocked and relatively rotated about the first axis, and re-engageable by axial relative movement of the first and second bodies along the axis in a second direction such that the first and second bodies can be locked in a new indexed position; the indexed articulated probe head further comprising at least one verification sensor configured to measure and provide information which is dependent on the relative spatial configuration of first and second bodies in their locked state, and wherein the apparatus is configured to compare information at least derived from the verification sensor, with predetermined information associated with the particular indexed position in which they are locked, and to react depending on the outcome of said comparison.

Embodiments of the invention will now be described, by way of example only, with reference to the following drawings in which:

FIG. 6 is a detail view of the indexing mechanism shown in FIG. 5a;

FIGS. 7a, 7b and 7c illustrate a single tooth of the part of the indexing mechanism shown in FIG. 5b;

Figure 1:
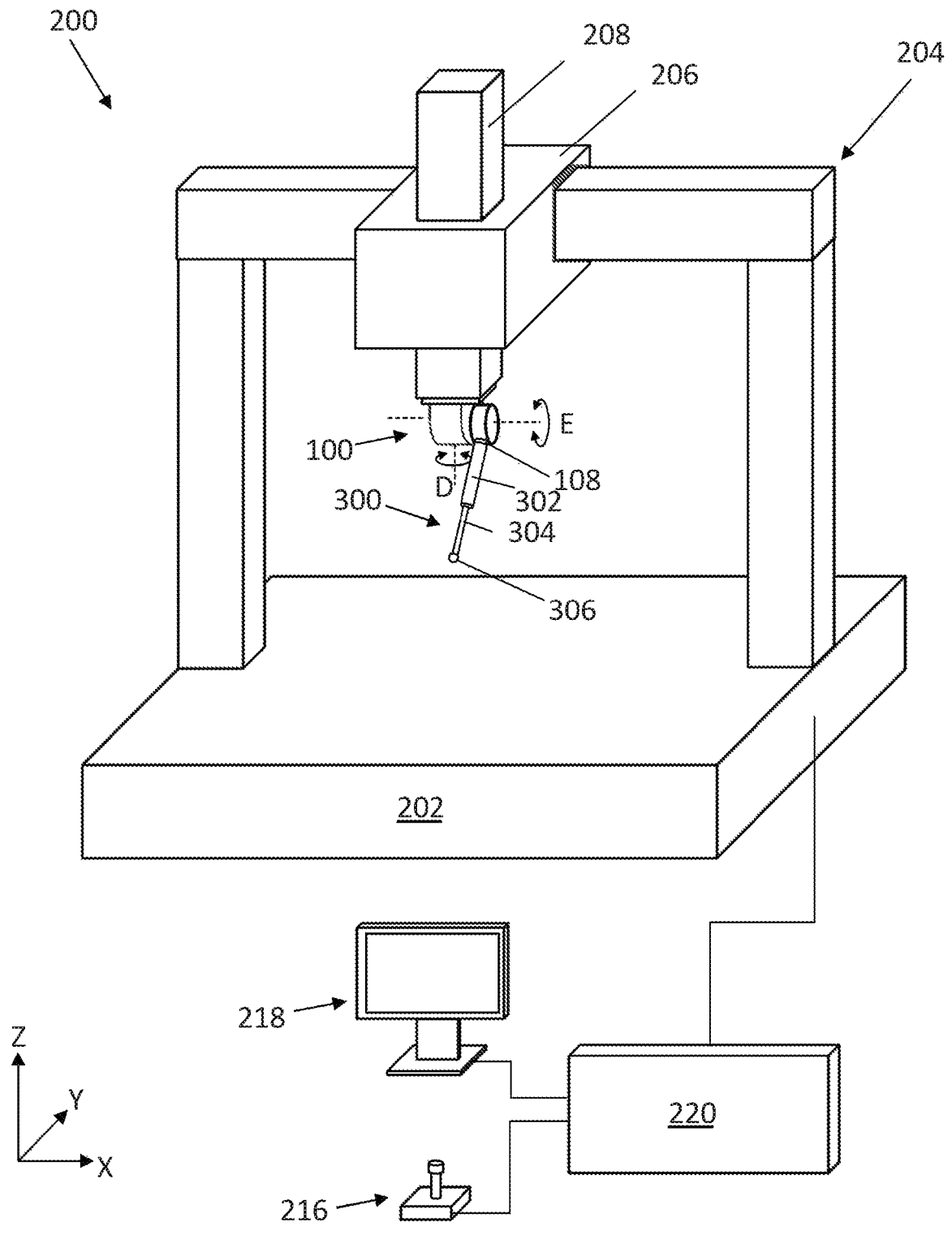
FIG. 1 illustrates an indexing head according to the present invention mounted on a coordinate measuring machine (CMM)

With reference to FIG. 1 there is shown an articulated head 100 according to the present invention mounted on a positioning apparatus 200.

The positioning apparatus 200 comprises a movement structure, in this case in the form of a coordinate measuring machine ("CMM"). The CMM 200 comprises a base 202, supporting a frame 204 which in turn holds a carriage 206 which in turn holds a quill 208 (or "Z-column"). Motors (not shown) are provided to move the quill 208 along the three mutually orthogonal axes X, Y and Z (e.g. by moving the frame along the Y axis, and the carriage 206 along the X axis, and the quill 208 along the Z-axis).

The quill 208 holds the articulated head 100, which in turn holds a probe 300. In this embodiment, the articulated head 100 facilitates repositioning of the probe 300 mounted on it, about first and second rotational axes D, E as explained in more detail below.

The combination of the two rotational axes (D, E) provided by the articulated head 100 and the three linear (X, Y, Z) axes of translation of the CMM 200 allows the probe 300 to be moved/positioned in five degrees of freedom (two rotational degrees of freedom, and three linear degrees of freedom).

Although not shown, measurement encoders may be provided for measuring the relative positions of the base 202, frame 204, carriage 206, quill 208 and the parts of the articulated head 100 so that the position of the measurement probe 300 relative to a workpiece located on the base 202 can be determined.

A controller 220 is provided for controlling the operation of the CMM 200, such as controlling the position and orientation of the probe 300 within the CMM volume (either manually, e.g. via an input device such as joystick 216, or automatically, e.g. under the control of an inspection program) and for receiving information (e.g. measurement information) from the CMM 200. A display device 218 can be provided for aiding user interaction with the controller 220. The controller 220 could, for example, be a dedicated electronic control system and/or may comprise a personal computer.

In the embodiment shown, the probe 300 is a contact probe comprising a probe body 302 and a stylus 304. The stylus 304 has a spherical tip 306 for contacting a workpiece to be inspected and in this embodiment the stylus 304 is deflectable relative to the probe body 302. The contact probe 300 could be what is commonly referred to as a touch-trigger probe, or could be a scanning (or analogue) probe. As will be understood, other types of probes including non-contact probes could be mounted on the articulated head 100.

In the current embodiment, the articulated head 100 comprises a probe mount 108 for facilitating the swapping of different probes thereon. In particular, this could be a mount which facilitates auto-changing of probes to and from a rack within the CMM's operating volume. For instance, the probe mount 108 and probe body 302 can comprise magnets for retaining the probe on the mount.

It is possible for the articulated head 100 to comprise built-in sensor componentry for detecting the deflection of the stylus 304 of a contact probe mounted thereon. However, in the present embodiment, all such sensor componentry is provided within the body 302 of the probe 300 itself. The probe 300 is configured to send stylus-deflection signals to the controller 220. As is commonplace, this can be done by a contact signal interface between the probe 300 and probe mount 108, wherein such signals are then relayed to the controller 220 via the articulated head's 100 and CMM's 200 cabling. Such an interface can also be used to supply power to the probe 300. Accordingly, as will be understood, the articulated head 100 will itself have a signal interface with the quill 208 which can be used to relay probe signals as well as to receive power and motor control instructions so as to control the articulated head 100.

Referring now to FIGS. 2 to 18, the articulated head 100 will now be described in more detail.

Figure 2:
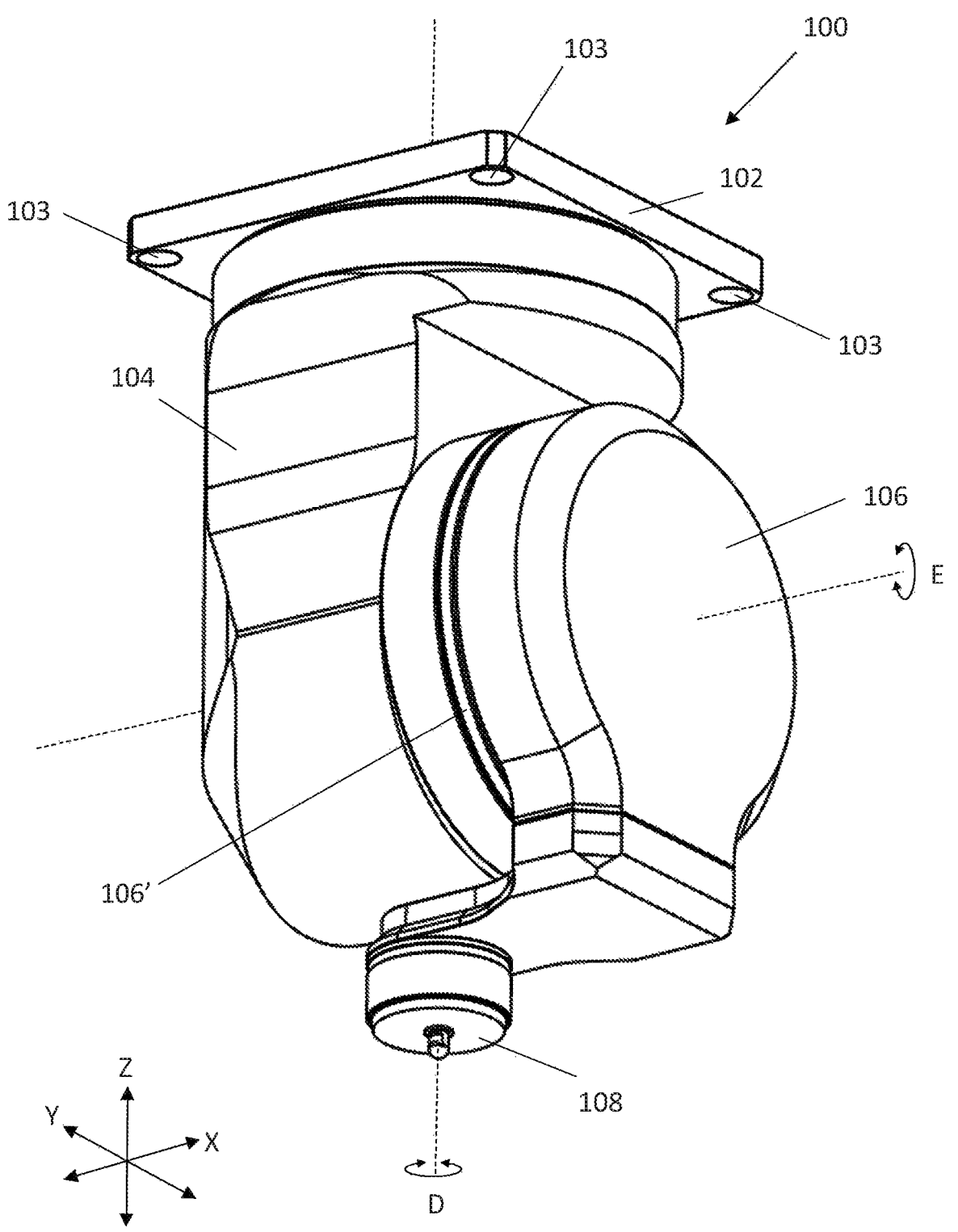
FIG. 2 illustrates the indexing head of FIG. 1 in isolation.

As shown in FIG. 2, the articulated head 100 comprises a first member 102 or "mounting plate", a second member 104 which is articulatable/rotatable relative to the first member 102 about a first axis of rotation "D", and a third member 106 which is articulatable/rotatable relative to the second member 104 about a second axis of rotation "E". The second axis of rotation "E" is orthogonal to the first axis of rotation "D". In the embodiment described, the first axis of rotation "D" is arranged parallel to the CMM's Z-axis, but this need not necessarily be the case.

The first member/mounting plate 102 comprises holes 103 through which bolts can pass so as to fasten the articulated head 100 to the quill 208 of the CMM 200. The third member 106 comprises a probe mount 108 on which a probe (such as the contact probe 300) can be interchangeably mounted.

In an alternative embodiment, the third member 106 could be an interchangeable member. For instance, rather than being a part of the articulated head 100, the third member 106 could be provided as part of the probe so that it can be (e.g. automatically) interchanged along with the probe. In this case, the articulated head 100 could comprise a mount member 106' for the third member 106, the mount member 106' being articulatable/rotatable relative to the second member 104 about the second axis of rotation "E". The mount member 106' and third member 106 can be provided with cooperating mounting features, to enable the third member 106 to be detachably mounted to the mount member 106'. Such cooperating mounting features could comprise features defining a kinematic mount, for example. One or more magnets could be provided for retaining the third member 106 on the mount member 106'.

Figure 3:
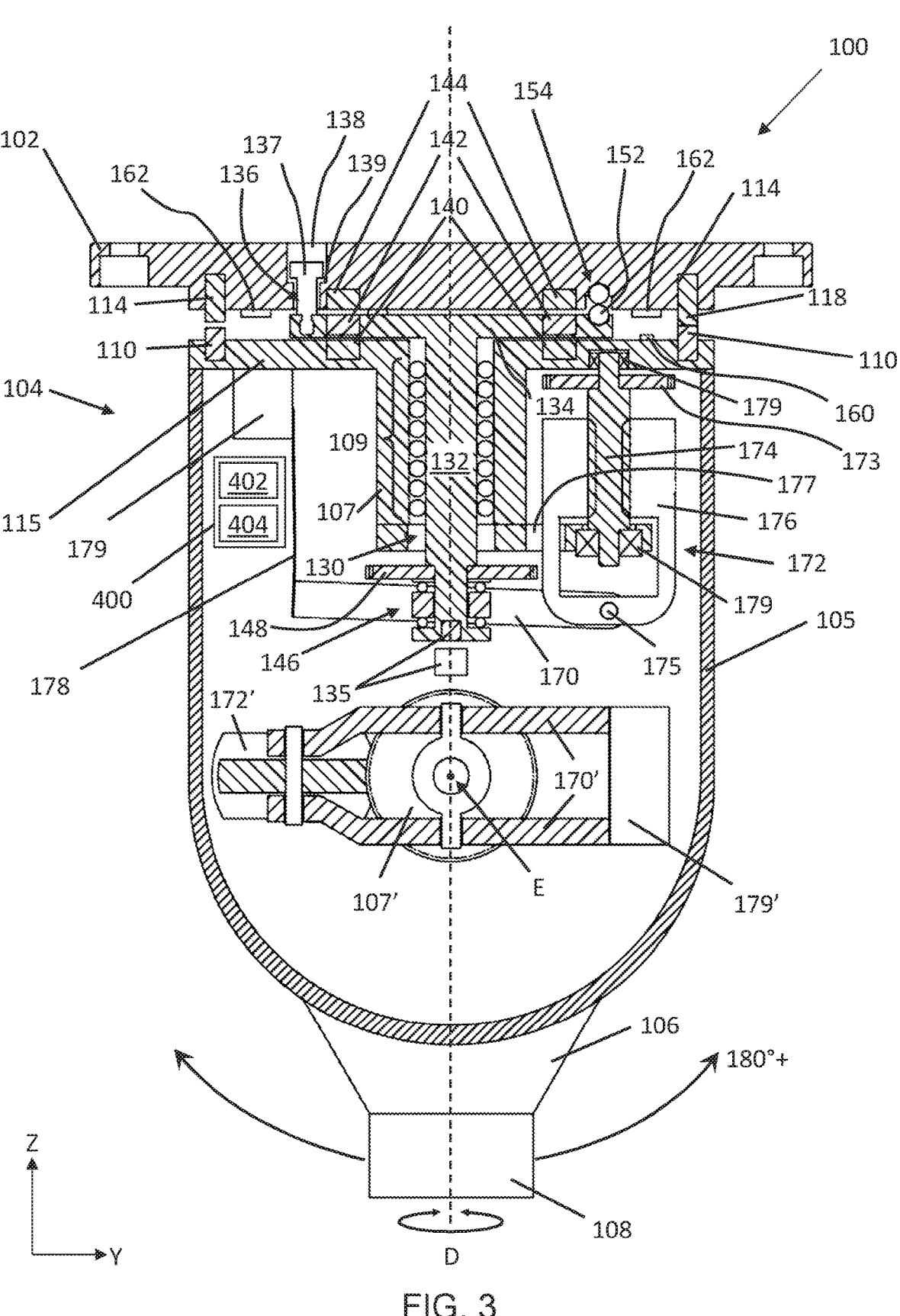
FIG. 3 illustrates a cross-sectional view of the indexing head of FIG. 1 when in its locked configuration.
Figure 4:
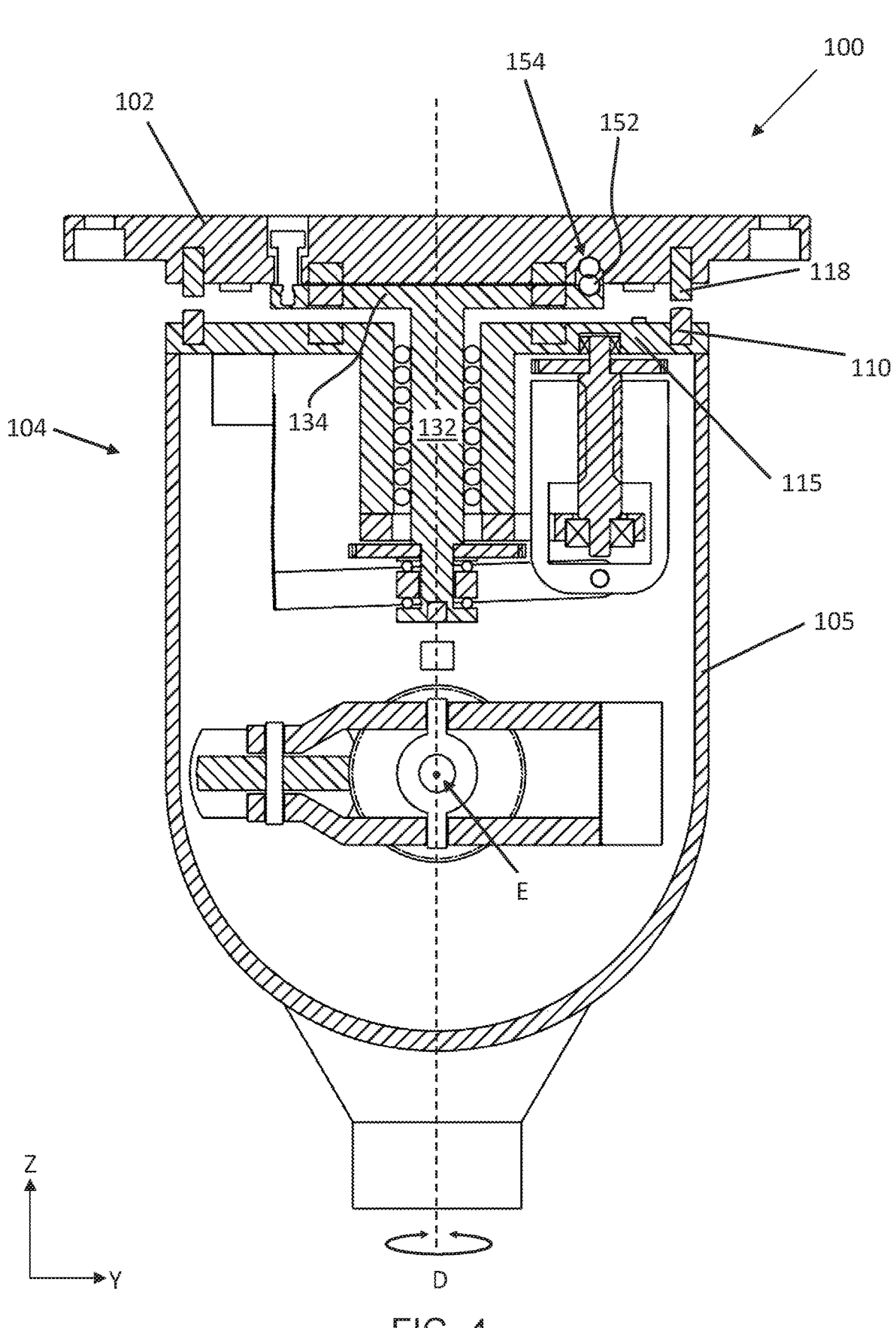
FIG. 4 illustrates a cross-sectional view of the indexing head of FIG. 1 when in its unlocked configuration.
Figure 5A:
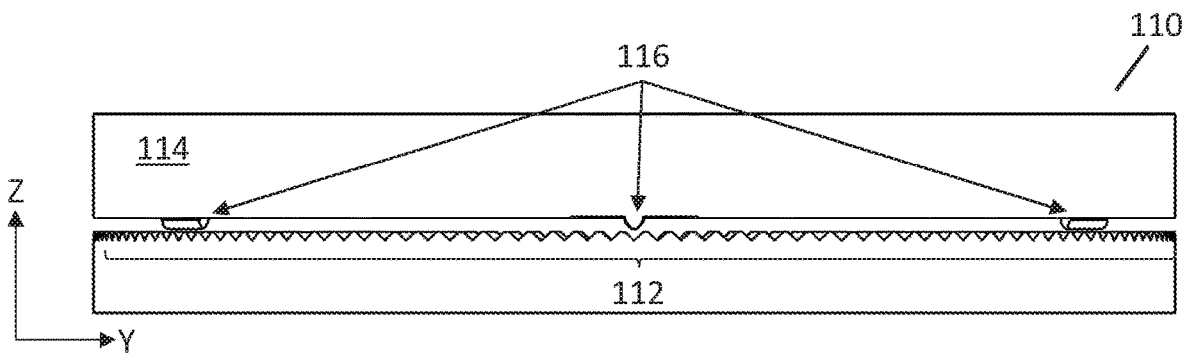
FIG. 5a illustrates the indexing mechanism of the indexing head of FIG. 1.
Figure 5B:
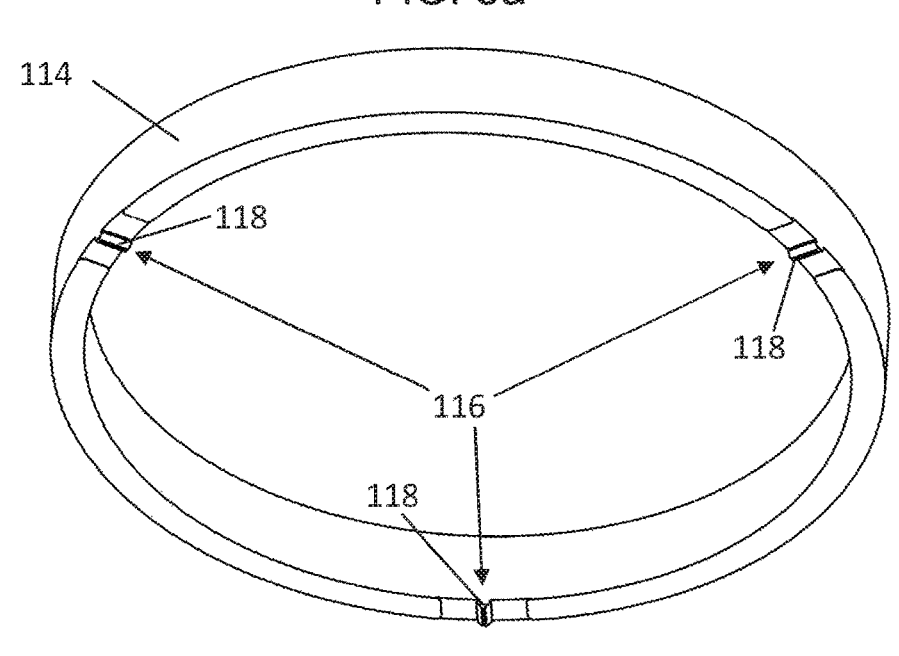
FIG. 5b illustrates one part of the indexing mechanism of FIG. 5a in isolation.
Figure 6:
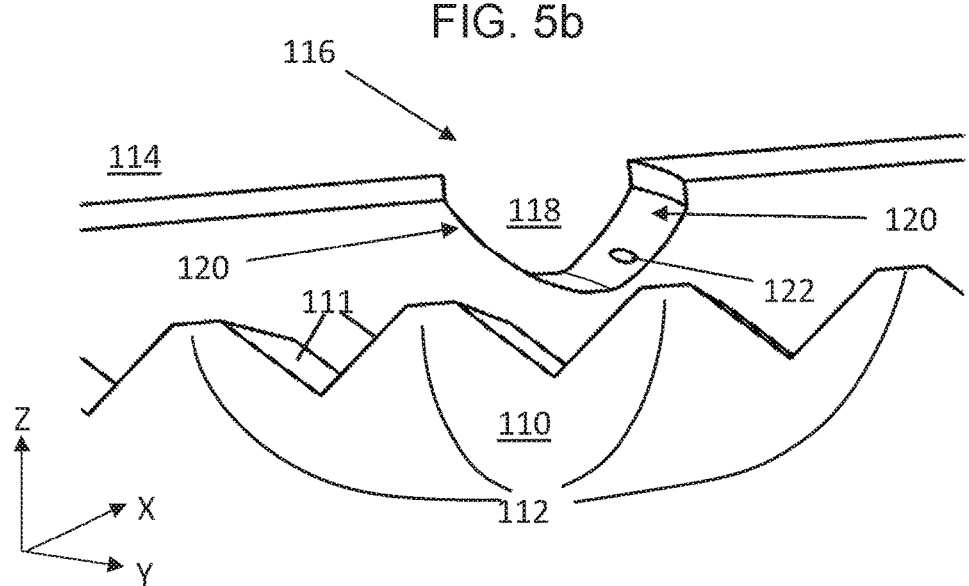
Figures 8, 9, 10A, 10B:
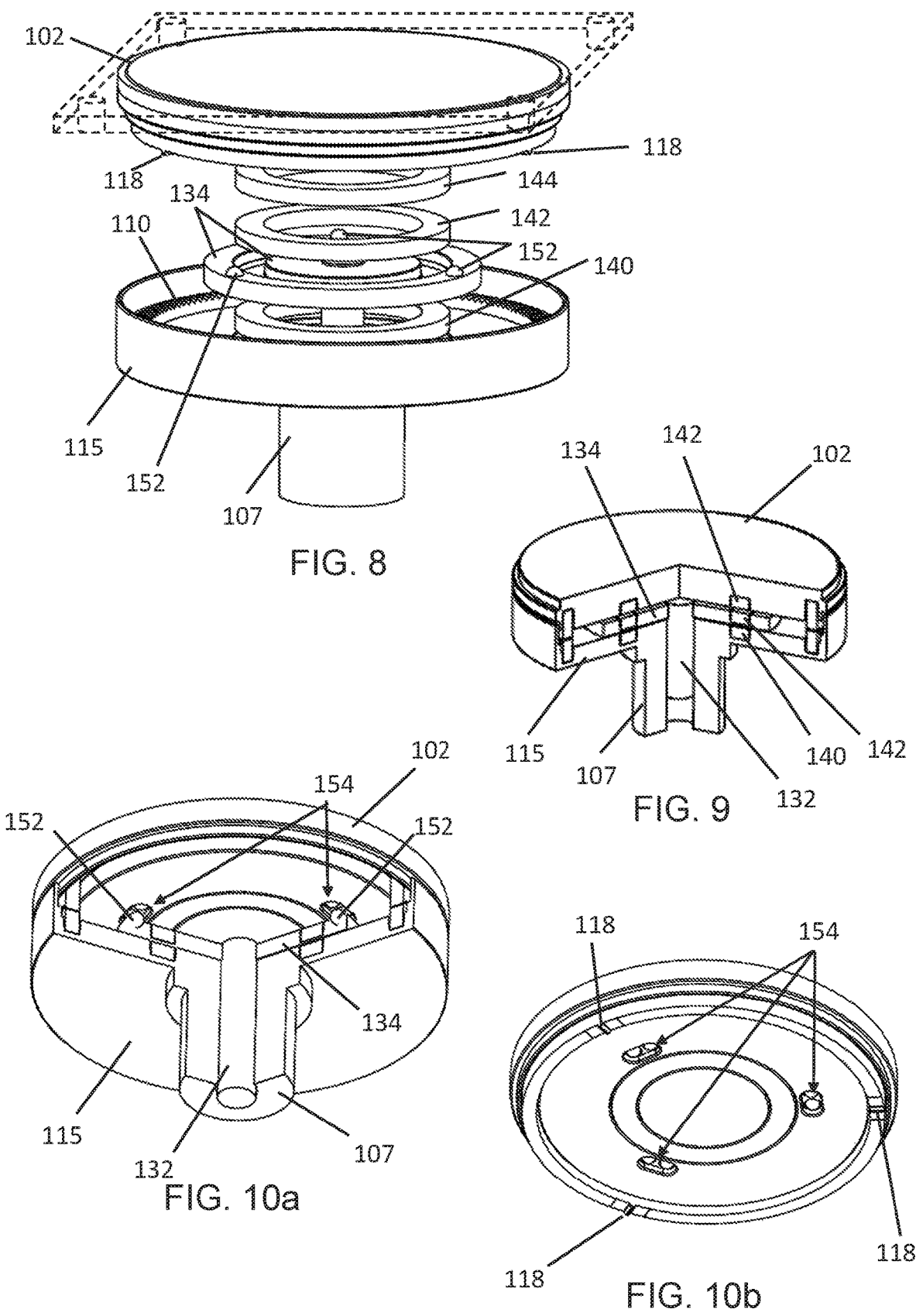
FIG. 8 is an exploded view of the different parts of the indexing and unlocking mechanisms of the indexing head of FIG. 1.
FIGS. 9 and 10a show cut-away views of the different parts of the indexing and unlocking mechanisms of the indexing head of FIG. 1.
FIG. 10b shows the underside of one of the articulated parts of the indexing mechanism of the indexing head of FIG. 1.

FIGS. 3 and 4 show a cross-sectional view of the articulated head 100 taken in the Z-Y plane. FIGS. 3 and 4 are substantially the same and are common views of the same articulated head, but in FIG. 3 the articulated head 100 is shown with the first member/mounting plate 102 and the second body 105 in their locked state and in FIG. 4 the articulated head 100 is shown with the first member/mounting plate 102 and the second body 105 in their unlocked state.

Many reference numerals are omitted from FIG. 4 to aid viewing of the various features of the articulated head 100.

The locking/unlocking, rotating and indexing mechanisms of the first axis "D" (i.e. of the first member/mounting plate 102 and the second member 104) will now be explained. In this embodiment, the locking/unlocking and indexing mechanism of the second axis "E" (i.e. of the second member 104 and third member 106) is substantially the same (but arranged perpendicular to that of the first axis "D") and so will not be described in detail and only some parts of which are schematically illustrated in FIGS. 3 and 4 (and labelled with the same reference numeral suffixed with a prime ' symbol).

The indexing mechanism of the first axis "D" comprises an arrangement of mutually engageable engagement elements provided on the first member/mounting plate 102 and the second member 104. In particular, there is provided a first annular member 110 having a continuous series of tapered teeth 112 (e.g. see FIGS. 5a and 6 for detailed views). The teeth 112 are substantially radially extending, in that the extent of the teeth predominantly extends along the radial direction (with respect to the radius of the first annular member; and also the first axis "D"). Accordingly, in this embodiment, the first annular member 110 is in the form of a "face spline member" and will subsequently be referred to as such (note that in particular, in the embodiment described, the face spline member has the configuration of a Hirth joint member). The teeth of the face spline member 110 are radially elongate and have a generally tapered cross-sectional profile (taken perpendicular to their length). In this embodiment, each side 111 of a tooth 112 is substantially flat/planar, although this need not necessarily be the case (for instance they could be curved or crowned like the below described crowned tooth 118).

The indexing mechanism/mutually engageable engagement elements further comprises a second annular member 114 which has features configured to intermesh with the teeth 112 of the face spline member 110. The second annular member 114 has features configured to engage only a subset of the continuous series of teeth provided on the face spline member 110 (see FIGS. 5b and 6 for detailed views). Accordingly, instead of the second annular member 114 providing a continuous series of inter-engaging teeth, the second annular member 114 merely comprises features configured to intermesh with the teeth 112 of the face spline member 110 at three discrete, equiangularly-spaced (120°), locations 116. In this particular embodiment, at each of said locations 116 there is provided a single feature only, in the form of a crowned tooth 118. Each crowned tooth 118 is radially elongate and has a generally tapered profile (taken perpendicular to their length) and thereby provides two curved engagement side surfaces 120 which are configured to engage the side surfaces 111 of the teeth 112 on the face spline member 110.

As illustrated in FIGS. 7a to 7c, the engagement side surfaces 120 of the crowned tooth 118 are curved along their length (in this embodiment along the radial dimension, or along the X-axis as shown in FIGS. 7a and 7c) as well as in their cross-sectional profile (taken perpendicular to their length/radial dimension, as shown in FIG. 7b). Such a configuration (i.e. a crowned tooth 118 which engages flat/planar teeth 112 on the face spline member 110) ensures that each engagement side surface 120 of the crowned tooth 118 presents an apex region 122. It is this apex region 122 which will tend to engage with the side surfaces 111 of the teeth 112 on the face spline member 110. Providing an apex region has been found to provide for more repeatable seating position between the first annular member/face spline member 110 and the second annular member 114. This is because providing the apex region 112 means that for any given pair of teeth on the first annular member/face spline member 110 and the second annular member 114, it is significantly more likely that the teeth in said pair will engage at the same region on their side surfaces 111, 120, each time they come together (compared to if the side surfaces 111, 120 of the teeth on both the first annular member/face spline member 110 and second annular member 114 are both substantially flat/planar), thereby helping to ensure that the first annular member/face spline member 110 and the second annular member 114 seat together in the same position each time they come together at a given angular orientation. In particular, such a configuration helps to provide for a kinematic coupling between the first annular member/face spline member 110 and the second annular member 114.

Furthermore, when the indexing increment becomes small (e.g. smaller than 7.5°, and particularly less than 5°, for instance approaching 2.5°), the described configuration has been found to be significantly advantageous over the balls and rollers indexing mechanism described in WO2006/079794. This is because the smaller the indexing increment, the smaller the intermeshing features are. Not only can it be difficult to accurately manufacture and assemble a ring of balls of having sufficiently smaller diameter, but due to the very small point of contact between balls of very small diameter with corresponding rollers, the Hertzian contact pressure would be extremely high, causing them to be overstressed and this in turn would result in undue wear and/or failure of the indexing mechanism.

For example, in the currently described embodiment, the first annular member/face spline member 110 and second annular member 114 have an outer diameter of 75 mm, and are provided with teeth which are sized so as to provide a 2.5° indexing increment, and the articulated head 100 is configured such that when in the locked position the first annular member/face spline member 110 and second annular member 114 will be held together by a force of approximately 120N (Newtons). The radius of curvature R' of the crowned tooth taken in a plane perpendicular to its length (e.g. in the Z-Y plane of FIG. 7b) is 1.8 mm and the radius of curvature R" of the crowned tooth taken in a plane along its length (e.g. in the Z-X plane of FIG. 7c) is 23 mm. In contrast, if a spherical ball were used in place of the crowned tooth, the ball would have to have a radius of curvature of <0.75 mm in order to fit between the teeth 112 of the first annular member/face spline member. Not only would it be difficult to assemble such small balls into the articulated head, but they would provide an incredibly small contact point, resulting in extremely high Hertzian contact pressure.

As will be understood, the same effect can be achieved by making the teeth 112 on the first annular member/face spline member 110 crowned, and providing the teeth 118 on the second annular member 114 with flat sides, although this can be more difficult to manufacture. Alternatively, the teeth 112, 118 on both the first annular member/face spline member 110 and the second annular member 114 could be crowned, although along with increased manufacturing difficulty, the teeth dimensions would need to be adjusted (in particular increased) in order to avoid undesirable Hertzian contact pressures.

The mechanism for locking and unlocking the indexing mechanism of the first axis "D" will now be described. In summary, in the particular embodiment described, the locking/unlocking mechanism relies solely on magnets to provide the retaining force between the first annular member/face spline member 110 and the second annular member 114 having the crowned teeth 118, and a motor-driven actuator is used to push the first member/mounting plate 102 and the second member 104 away from each other so as to separate the first annular member/face spline member 110 and the second annular member 114 having the crowned teeth 118. This mechanism will be described in more detail immediately below.

In the embodiment described, the locking/unlocking mechanism comprises a trio of stacked magnets. In particular a first 140 ring magnet is provided on the top face 115 of the housing 105 of the second member 104, a second 142 ring magnet is provided on the contact plate 134 of a prop 130 (described in more detail below), and a third magnet 144 is provided on the first member/mounting plate 102. The first 140, second 142 and third 144 ring magnets are identical in shape and size, are stacked so as to be co-axial with each other, and are arranged so that both the first 140 and third 144 ring magnets attract the second magnet 142 which is sandwiched between them. The poles of the ring magnets are axially arranged (i.e. such that the two magnetic poles are on the top and bottom of the flat surfaces of the rings). In particular, the ring magnets are configured such that the north pole of the first magnet 140 faces the south pole of the second 142 magnet, and such that the north pole of the second magnet 142 faces the south pole of the third magnet 144. As explained in more detail below, when in the locked and unlocked positions, the second member 104 is retained solely by magnetic attraction, and in particular solely by the magnetic attractive forces between the third 144, second 142 and first 140 magnets.

The locking/unlocking mechanism comprises a prop 130 which comprises a shaft 132 and a "head" or "contact plate" 134. The shaft 132 of the prop 130 is supported within a linear cylindrical bearing housing 107 provided by the top face 115 member of the housing 105 of the second member 104. A bearing (in this case an array of ball-bearings 109) is provided between the shaft 132 and the cylindrical bearing housing 107 so as to facilitate relative linear and rotational motion between the shaft 132 and the cylindrical bearing housing 107 (i.e. along and about the first axis "D"). The contact plate 134 comprises a radially extending face which is sandwiched between the bodies of the first member/mounting plate 102 and the second member 104.

A motor-driven lever 170 is provided for effecting said linear/axial movement of the shaft 132 along the first axis "D". The lever 170 is pivotally mounted toward its first end to a flexure 178 which is anchored to the housing 105 of the second member (in this embodiment to the top plate 115) via a mounting block 179. The lever 170 is attached toward its second end to a lead screw mechanism 172 which is configured to raise and lower second end of the lever 170. The lever is attached, at a point between its first and second ends, to the end of shaft 132 distal the contact plate 134 via a bobbin 146 (which facilitates relative rotation of the shaft 132 and lever 170). A motor (not shown) is configured to drive the lead screw mechanism 172. In particular, a motor (not shown) is configured to turn a lead screw 174 via a drive gear 173 which when turned causes a nut 176 (which is attached to the lever 170 via a pin 175) to travel axially along the lead screw 174. The lead screw 174 is also anchored to the housing 105 of the second member (in this embodiment to the cylindrical bearing housing 107) via a mounting bracket 177 and bearings 179 such that it can rotate about its axis of rotation, but such that it is fixed relative to the to the housing 105 of the second member in the Z-dimension (as shown in FIGS. 3 and 4).

It can be advantageous if the drive mechanism for the prop 130 resists back driving (in other words, it is not easily manually back-driven), especially if the three magnet design described below is not adopted. This is because a drive mechanism which is not easily manually back-driven will tend to hold its position even when the motor/power source is not activated if the net external force on the prop 130 is sufficiently low. This can avoid the need to servo the drive mechanism/motor to hold a fixed position and can therefore reduce the power consumption of the articulated head.

Accordingly, this can reduce the amount of heat generated by the drive mechanism/motor, which in turn can improve the metrological performance of the articulated head by reducing thermal distortions. A lead screw mechanism with a high gear pitch is one example of a drive mechanism which is not easily back-driven.

As explained in more detail below another motor (not shown) is provided which has a gear configured to engage and drive a drive gear 148 provided on the shaft 132 towards its end distal the contact plate 134, and can be operated to cause the housing 105 of the first member 104 (and everything anchored to it) to rotate/spin around the shaft 132 about the first axis "D". A first (or "primary") rotary encoder device 135 (e.g. a magnetic absolute rotary encoder device) is provided for monitoring the relative angular position of the housing 105 of the first member 104 and the shaft 132 about the first axis "D".

The prop's contact plate 134 and the first member/mounting plate 102 have corresponding engagement elements. In particular, the corresponding engagement elements comprise features which are configured to provide a repeatable, and in particular a kinematic, coupling between the prop's contact plate 134 and the first member/mounting plate 102 when engaged. In the embodiment described, the prop's contact plate 134 comprises three engagement balls 152 located 120° apart from each other, and the first member/mounting plate 102 has three pairs of engagement balls 154, the pairs being located 120° apart from each other (see FIG. 10b). Each pair of engagement balls 154 on the first member/mounting plate 102 defines a channel or groove for receiving one of the engagement balls 152 located on the contact plate 134.

As also shown in FIGS. 3 and 4, a second rotary encoder device is provided, which comprises an annular scale 162 provided on the underside of the first member/mounting plate 102 and first 160 and second (not shown) readheads provided on the top face 115 of the housing 105 of the second member 104 (although as will be understood they could be provided the other way around). In the embodiment described, the first 160 and second (not shown) readheads are annularly spaced 90° apart from each other. In the embodiment described, the second rotary encoder device is an incremental optical rotary encoder device. In the particular embodiment described, the second encoder device is a high-resolution encoder which enables the relative position of the first member/mounting plate 102 and the body 105 of the second member 104 to be established within 10 nm (nanometres). Its purpose is described in more detail later on in this document.

The unlocking/reorienting/locking process for the first member/mounting plate 102 and the second member 104 will now be described. FIG. 3 shows the first member/mounting plate 102 and the second member 104 in a locked state. In the locked state a probe 300 mounted on the probe mount 108 can be held in a steady and well-defined angular position such that it can be used in a measurement operation to inspect an artefact. However, it might be desirable to reorient the probe mounted on the probe mount 108, for example for access reasons. To do so it will be necessary to unlock the first member/mounting plate 102 and the second member 104, cause them to be relatively reoriented, and then lock them together at the new orientation.

Unlocking the first member/mounting plate 102 and the second member 104 involves driving the prop 130 axially along the first axis "D" toward the first member/mounting plate 102. In the described embodiment, this is effected by operating the motor (not shown) to drive the lead screw 174 so as to drive the lead screw nut 176 upwards in the Z-dimension (in the orientation shown in FIGS. 3 and 4). After a short distance, the engagement balls 152 on the contact plate 134 will contact and engage the pairs of engagement balls 154 on the first member/mounting plate 102, after which continued driving of the lead screw 174 will cause the lever 170 and lead screw mechanism 172 to push the housing 105 axially downward (via the cylindrical bearing housing 107 to which the lead screw 174 is anchored), thereby causing the housing 105 of the second member 104 and first member/mounting plate 102 to separate. The lead screw 174 is operated so as to separate the second member 104 and first member/mounting plate 102 by a controlled, predefined amount which is sufficient such that the crowned teeth 118 are clear of the teeth 112, but as explained in more detail below, is not too great because it is desirable that the first magnet 140 remains sufficiently close to the second magnet so as to have a reasonable amount of pull on the second magnet 142 even in the unlocked state. FIG. 4 illustrates the indexing head 100 in such an unlocked state.

When in the unlocked state, the motor (not shown) driving the lead screw mechanism 172 is stopped, and the motor (not shown) which is engaged with the shaft's 132 drive gear 148 is operated in order to effect a change in rotational position of the second member 105 of the articulated head 100. As noted above, in the unlocked state, the prop 130 is engaged with the first member/mounting plate 102 via the engagement balls 152, 154 and so is rotationally fixed with respect thereto (in the unlocked state). Accordingly, when the motor (not shown) which is engaged with the shaft's 132 drive gear 148 is operated, it causes the whole housing 105, 107, 115 of the second member 104 (and all components anchored thereto, which includes the aforesaid motors) to be driven about the shaft 132, and hence causes the whole housing 105, 107, 115 of the second member 104 (and all components anchored thereto) to rotate about the first axis "D".

The relative rotational position of: i) the housing 105, 107, 115 of the second member 104; and ii) the shaft 132 (and hence the first member/mounting plate 102), is known from the first ("primary") encoder apparatus 135. Accordingly, the controller 220 can use the output from the first encoder apparatus 135 to control the motor (not shown) engaged with the shaft's drive gear 148 so bring the first member/mounting plate 102 and second member 104 to a desired relative orientation. As will be understood, the rotational position needs to be controlled to a sufficiently high degree of precision such that when in the new desired relative orientation, the crowned teeth 118 on the second annular member 114 sit opposite the valleys of the teeth 112 on the first annular member/face spline member 110, so that when they are locked together the crowned teeth 118 nestle cleanly between two teeth 112 of the first annular member/face spline member 110.

The process of locking the first member/mounting plate 102 and the second member 104 will now be described. In the described embodiment, this is effected by operating the motor (not shown) to drive the lead screw 174 so as to drive the lead screw nut 176 downwards (in the orientation shown in FIGS. 3 and 4). This will cause the housing 105 of the second member 104 to be pulled up toward the first member/mounting plate 102 until the crowned teeth 118 on the second annular member 114 engage the teeth 112 of the face spline member 110, after which continued operation of the motor will cause the prop 130 to be retracted away from the first member/mounting plate 102, thereby disengaging the engagement balls 152, 154 provided on the contact plate 134 and the first member/mounting plate 102. Accordingly, at the point of disengagement of the engagement balls 152, 154, the first member/mounting plate 102 and the second member 104 are held via the kinematic constraint provided by the six points of contact between the three crowned teeth 118 and the teeth 112 of the first annular member/face spline member 110.

Figures 11A, 11B, 11C, 11D:
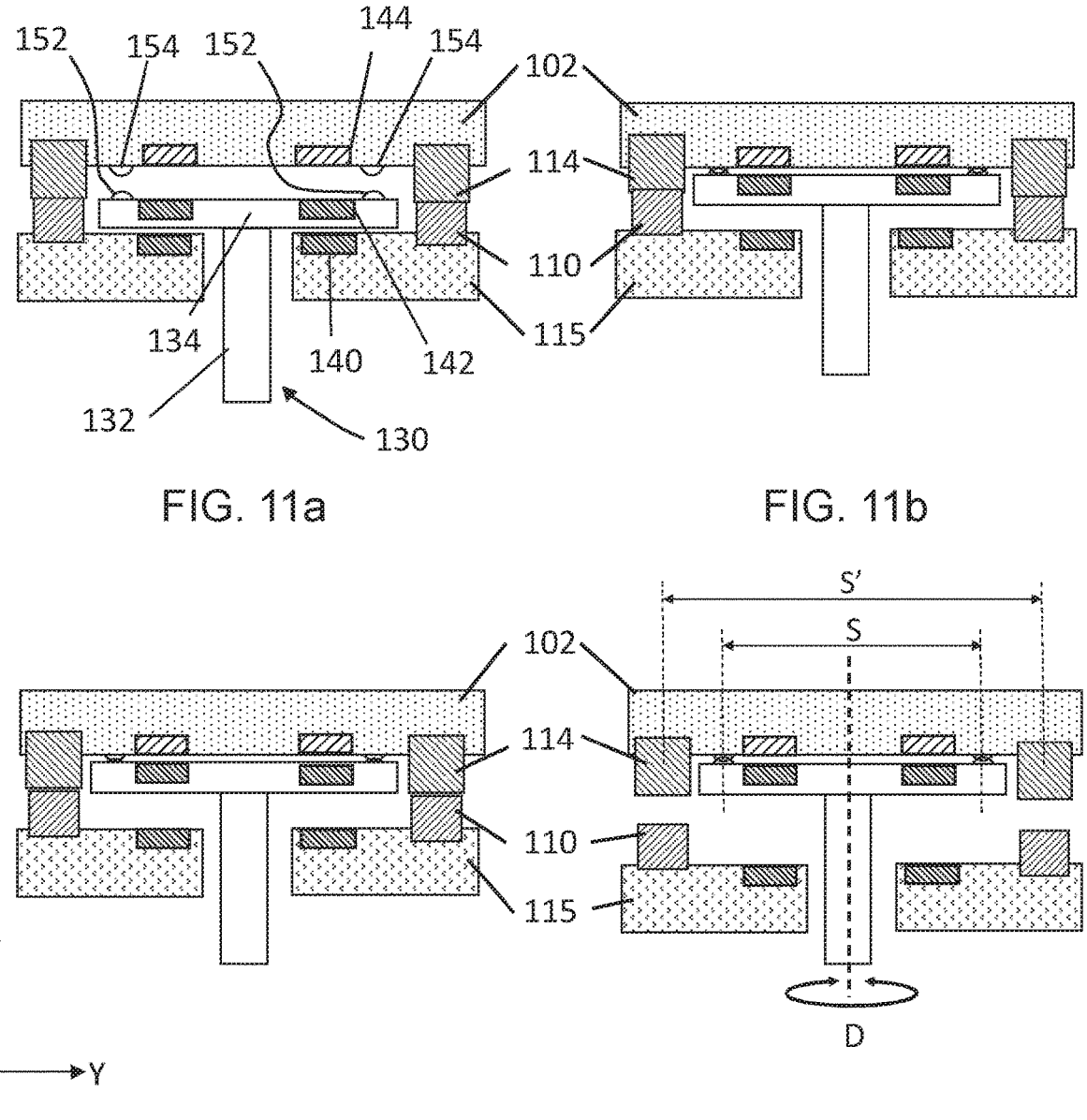
FIGS. 11a to 11d show schematic cross-sectional views of the different parts of the indexing and unlocking mechanisms of the indexing head of FIG. 1 at different stages during an unlocking and locking operation.

The way in which the first 140, second 142 and third 144 magnets interact with each other will be described with reference to FIGS. 11a to 11d, which schematically illustrate the prop's shaft 132 and contact plate 134, the second member's top plate 115, the first member/mounting plate 102, the second annular member 114 (which as the three crowned teeth 118), the first annular member/face spline member 110 (which has the continuous series of teeth 112) and the first 140, second 142 and third 144 ring magnets. FIG. 11a illustrates the first member/mounting plate 102 and the second member 104 in a locked position; i.e. in which the teeth 112 on the first annular member/face spline member 110 and the teeth 118 on the second annular member 114 are fully engaged. FIG. 11b illustrates the first member/mounting plate 102 and the second member 104 in a locked position, but at the point where the prop 130 has been actuated to the point where the engagement balls 152 on the contact plate 134 have engaged the engagement balls 154 on the first member/mounting plate 102 and is about to start separating the teeth 112 on the first annular member/face spline member 110 and the teeth 118 on the second annular member 114. FIG. 11c illustrates the first member/mounting plate 102 and the second member 104 in which they have begun to separate, but have not yet reached their fully unlocked configuration. FIG. 11d illustrates the first member/mounting plate 102 and the second member 104 in an unlocked position in which in which the teeth 112 on the first annular member/face spline member 110 and the teeth 118 on the second annular member 114 are fully clear of each other such that the first member/mounting plate 102 and the housing 105 of the second member 104 are free to rotate relative to each other about the first axis "D".

In the configuration shown in FIG. 11a, the third magnet 144 is attracted to both the second 142 and third 144 magnets, and so thereby pulls the first member/mounting plate 102 toward the prop 130 and the housing 105 of the second member 104. In the embodiment described, the apparatus is configured such that there is a total locking force of approximately 120N between the first member/mounting plate 102 and the second member 104 when in the locked position (which with appropriate head dimensions, in particular the diameters and locations of the indexing mechanism and of the ring magnets, provides a breakout torque of 2 Nm). As will be understood, the breakout torque is moment that can be exerted before the first and second bodies start to peel away from each other. This can be important because the articulated head will often be eccentrically loaded.

As will also be understood, the breakout torque is dependent on factors other than the retaining/holding/locking force, such as the diameter of the face spline member 110 or the diameter of the ring of engagement balls 152, 154.

In order to transition to an unlocked state, the prop 130 needs to be moved toward the first member/mounting plate 102. Whilst it would seem that the presence of the first magnet 140 would at least initially increase the work required of the motor to do so (compared to if it were not present), it should be noted that the apparatus is configured such that in the locked state shown in FIG. 11a, the prop's contact plate 134 is held in a predetermined position which puts the second magnet 142 part-way between the first 140 and third 144 magnets. This ensures that the first magnet's 140 pull on the second magnet 142 is significantly less than it would be if they were to be in contact with each other. Also, the third magnet 144 has a degree of magnetic pull on the second magnet 142. Accordingly, the work/power required to move the second magnet (and hence the contact plate 134) away from the first magnet 140 is significantly less compared to if the first 140 and second 142 magnets were in contact.

In particular, in the embodiment described and shown, the prop's contact plate 134 is held in a predetermined position which puts the second magnet 142 approximately mid-way between the first 140 and third 144 magnets, although such that the second magnet 142 is slightly closer to the first 140 magnet than the third magnet 144. This means that the magnetic forces on the second magnet applied by the first 140 and third 144 magnets is almost (but not quite) balanced. Accordingly, very little work/power is required of the motor to move the prop 130 toward the first member/mounting plate 102. Indeed, once the second magnet 142 has reached the mid-way point between the first 140 and third 144 magnets, the magnetic pull of the third magnet 144 on the second magnet 142 will be greater than that of the first magnet 140. As the contact plate 134 progresses toward the first member/mounting plate 102 the magnetic pull of third magnet 144 on the second magnet 142 progressively increases.

When the prop 130 has been moved to the configuration shown in FIG. 11b, it is then necessary for the motor to pull the teeth 118 on the body 105/115 of the second member 104 away from the teeth 112 on the first member/mounting plate 102. Whilst there is a sufficiently large holding/retaining force (at least 160N) holding the second member 104 on the first member/mounting plate 102 (via the engagement balls 152, 154) at this point, the motor needs to exert less than the holding/retaining force because it now only needs to exert sufficient force (which in this embodiment is about 95N) so as to overcome the attractive force between the first magnet's 140 pull on the second 142 and third 144 magnets.

The motor continues to drive the prop 130 until the housing 105 of the second member 104 has moved away from the first member/mounting plate 102 by an amount sufficient for the teeth 112 of the first annular member 110 to be clear of the teeth 118 on the second annular member 114, as illustrated in FIG. 11d. At this point, the retaining force holding prop 130 and the housing 105 of the second member 104 onto the first member/mounting plate 102 is approximately 160N. A higher retaining force is achieved in the configuration shown in FIG. 11d compared to FIG. 11a by controlling the gaps between the first 140, second 142 and third 144 magnets. In particular, despite there being a relatively large gap between the first 140 and second 142 magnets in the unlocked state of FIG. 11d, there is a relatively small gap between the second 142 and third 144 magnets (compared to the gap between the first 140 and second 142 magnets when in the locked state of FIG. 11a) so as to achieve the higher total retaining force. A higher total retaining force is desirable in the unlocked position because the diameters S of the rings of the engagement balls 152, 154 is smaller than the diameters S' of the first 110 and second 114 annular members, which means that they require a higher pulling/retaining force to ensure the same or similar breakout torque of about 2 Nm (Newton-Metre).

When in the unlocked state shown in FIG. 11d, the first 102 and second 104 members can be relatively rotated about the D axis to a new relative rotational position/orientation.

As described above, this involves driving the motor (not shown) which engages the shaft's drive gear 148 to cause the body 105 of the second member 104 to rotate around the shaft 132. The output of the first encoder apparatus 135 is used to monitor the relative position of the body 105 of the second member 104 and the shaft 132 (and therefore the first member/contact plate 102, the rotational orientation of which about D is fixed). When the output of the first encoder apparatus 135 indicates that the body 105 of the second member 104 is now at the desired indexed position, the motor is stopped, and the first 102 and second 104 members are locked together as described below.

In order to lock the first 102 and second 104 members in their new rotational position/orientation, the motor is operated to drive the lead screw mechanism 172 so as to drive the lead screw nut 176 down the lead screw 174. This initially causes the housing 105 of the second member 104 to be pulled up toward the first member/mounting plate 102. As will be understood, very little power is required of the motor because the housing 105 of the second member 104 is already being pulled toward the first member/mounting plate 102 by the first 140, second 142 and third magnets 144. This continues until the teeth 112 of the first annular member 110 engage the teeth 118 of the second annular member 114 (shown in FIG. 11b) at which point the motor and lead screw mechanism 172 has to start pushing against the magnetic forces so as to separate the props' contact plate 134 from the first member/mounting plate 102. However, at this point, the first magnet 140 is much closer to the second magnet 142 and so it exerts a relatively large force on it. Indeed, at this point the net force on the second magnet 142 at the state illustrated in FIG. 11b is only 95 N. Accordingly, the motor and lead screw mechanism 172 is assisted by the magnets and can much more easily pull the second magnet 142 (and hence the prop 130) away from the third magnet 144 (and hence the first member/mounting plate 102) until the contact plate 134 reaches the predetermined axial/Z position shown in FIG. 11a.

It is known from the output of the first rotary encoder 135 what indexed rotational position the first member/mounting plate 102 and the second member 104 are at. It can also be useful to check that the first member/mounting plate 102 and the second member 104 have properly locked together. This could be achieved in various ways, for instance by using one or more sensors that can check the separation between the opposing faces of the first member/mounting plate 102 and the second body 105, and if the separation is greater than a fixed threshold amount (which is the same for all indexed positions), then an corrective action can be taken (e.g. an error/warning can be reported and/or action taken to try to remedy the problem such as by attempting an unlock/relock operation, for instance from a different position/direction, and/or demand recalibration).

In the present embodiment described, there is provided a sensor (hereinafter labelled as the "verification" sensor, because it is used to check/verify that the first member/mounting plate 102 and the second body 105 have locked together properly) which is configured to measure and provide information about the relative spatial configuration of first and second bodies in their locked state. The output of the verification sensor is compared to predetermined information associated with the particular indexed position in which they are locked. If the output of the verification sensor differs from the predetermined information by more than a predetermined amount, then such corrective action can be taken.

In the particular embodiment described, the verification sensor, is the above described second rotary encoder device. Accordingly, the outputs of the first 160 and second (not shown) readheads of the second rotary encoder device are used to ensure that the first member/mounting plate 102 and second member 104 have properly locked together. In particular, when locked, the outputs of the first 160 and second (not shown) readheads are passed to electronics 400 within the readhead, which, for example, comprises a processing device 402 (e.g. a CPU (Central Processor Unit), FPGA (Field Programmable Gate Array), or ASIC (Application Specific Integrated Circuit), or the like) and memory 404. The processing device 402 compares the values received from the first 160 and second (not shown) readheads to values stored in a lookup table which resides in the memory 404. In particular, the processing device 402 compares the outputs of the first 160 and second (not shown) readheads to determine whether their outputs are substantially the same as those values stored in the look-up table's element(s) associated with the particular indexed position. If the output of either or both of the first 160 or second (not shown) readhead is substantially different to the values stored in the lookup table (e.g. the difference is greater than 100 nm), then this could be an indication that something is wrong, e.g.: the first member/mounting plate 102 and the second body 105 have not properly locked together; the teeth 112/118 have crashed; there is debris between the teeth 112/118; there is excessive wear between the teeth/118, etc. Accordingly, the apparatus (e.g. the controller) can then take corrective action in such a circumstance. Such correction action could include: causing the first member/mounting plate 102 and the second body 105 to unlock and relock again; outputting a warning signal to an operator and/or other process; halting the current operation, etc.

As mentioned above, the second rotary encoder device is an incremental encoder device. The outputs of the first 160 and second (not shown) readheads therefore do not comprise any absolute position information. Accordingly, rather than comparing absolute position information, the processor 402 compares relative (position) data/information. In particular, for example, as will be understood by those skilled in the art of position measurement encoders, the scale of an incremental position encoder typically comprises an array of regularly spaced features, arranged at a particular spacing, or "period" (which in the described embodiment is 20 μm, but as will be understood scales of other periods can be used). The readhead can read the features (e.g optically, magnetically, inductively, depending on the technology used) and the readhead, or its output, is normally used to "count" the relative position of the readhead and scale as they move relative to each other. It is also well known that the signals received by the readhead and/or output by the readhead can be interpolated to provide a measurement of the relative position of the readhead and scale to a resolution much finer than the actual period of the scale. Such an interpolated reading is often referred to as a "phase" reading. For example, typically quadrature (e.g. SIN and COS) signals are generated from the scale signals and/or are output by a readhead. Such quadrature (e.g. SIN and COS) signals can be interpolated to provide such a "phase" reading. In the embodiment described, it is the interpolated or "phase" reading which is used by the processor 402 and compared with a pre-stored "phase" reading stored in the lookup table's element associated with the particular value.

Accordingly, it is not necessary for the first 160 or second (not shown) readheads to be reading the scale 162 as the first 104 member/mounting plate 102 and the second body 105 move relative to each other as the indexed position is changed (although, if the configuration allows, this can be done). Rather, a single reading can be taken and output by the first 160 and second (not shown) readheads when the lock operation has completed, and the interpolated or "phase" value of those reading can be compared with the pre-stored "phase" readings stored in the lookup table's element associated with the particular value. If either or both of the phase readings differ by more than a predetermined amount (e.g. 100 nm as per the above example), then corrective action could be taken as described above.

Accordingly, the data elements in the look-up table could be said to be a "phase-signature" for each of the calibration indexed positions, and if the values of the phase readings of the first 160 and second (not shown readheads) differ sufficiently from the look-up tables' phase-signature for the given indexed position, then corrective action could be taken.

The lookup table is populated before the articulated head 100 is used for a measuring operation (e.g. could be populated during a calibration procedure). This can comprise the steps of, locking the first 104 member/mounting plate 102 and the second body 105 relative to each other in a given indexed position, and recording/storing the phase readings of the first 160 and second (not shown) readheads in an element/data cell associated with the given indexed position. This is then repeated for each of the articulated head's indexed positions (or at least for the indexed positions in which the head is to be used and for which such verification is desired).

Optionally, the lookup table could be updated over time so as to allow for small degrees of drift over time. This could happen continuously or at regular intervals. This could be done as part of a dedicated calibration process, or it could be done during measurement operations. For example, each time the first member/mounting plate 102 and the second body 105 successfully lock together at any given indexed position (e.g. they pass the above described 100 nm test), the phase reading output by the first 160 and second (not shown) readheads could be stored in the lookup table in place of the previous value.

As will be understood, if desired, the look-up table could be replaced with a function which describes the values in the look-up table. However, a look-up table can be preferred due to its ease of generation and because it is easy to keep it up to date.

As will be understood, rather than two readheads, a single readhead could be used, or more than two readheads could be used. It is not necessary for multiple readheads to be placed 900 apart from each other around the scale 162. However, it has been found that providing multiple readheads which are not diametrically opposite each other (i.e. not at 180°) is particularly advantageous because it can provide information about the spatial configuration of the first member/mounting plate 102 and the second body 105 in multiple dimensions, and providing them at substantially/approximately 90° can be preferred for reasons of efficiency and optimum performance.

The second rotary encoder device described above is an incremental encoder, but as will be understood, it could instead by an absolute encoder device.

In the above described embodiment, the verification sensor, is a rotary encoder device. However, it need not necessarily by the case. Other types of sensor could be used, such as, for example, a position sensitive device (PSD) the output of which is dependent on the relative spatial position of the first member/mounting plate 102 and the second body

105 when locked together. In this case, a lookup table could be populated during a calibration stage so as to record the output of the PSD for each of the indexed positions of interest (e.g. which could be all indexed positions or only those which are intended to be used during a subsequent measurement operation). Subsequently, in use, when the first member/mounting plate 102 and the second body 105 are locked in particular indexed position, the PSD can provide an output to the processor 402 which is then compared to the value stored in the particular element of the lookup table stored in memory 404 which is associated with the particular indexed position. If the output of the PSD differs by more than a threshold amount, then corrective action can be taken.

In an alternative embodiment, the verification sensor is configured to measure just the relative height/separations of the first and second bodies (e.g. via a capacitive sensor). However, advantageously, when the first and second bodies are locked together, the output of the verification sensor is compared to a pre-stored value in the element of the look-up table which is associated with the particular indexed position at which the first and second bodies are locked together.

As will be understood, further variations and alternative embodiments of the articulated joint described above are possible. For instance, one or two of the first 140, second 142 and third 144 magnets could be replaced with magnetically attractable (e.g. ferrous) material. This would provide a similar, albeit weaker, effect to that providing three magnets. Accordingly, the one or two magnets that remain would need to be stronger, and therefore bigger, which could also (depending on the configuration) mean that a larger peak motor force is needed.

In another similar embodiment, the first magnet 140 is located elsewhere. For example, the first magnet 140 could be located at/toward the end of the shaft 132 which is distal the contact plate 134. Again, this would provide a similar effect in terms of aiding the motor during the locking/unlocking processes, but because the first magnet 140 is located far away from the first member/mounting plate 102 it would provide little if any retaining force, and so it would be necessary to provide bigger/stronger second 142 and/or third 144 magnets.

Figure 12:
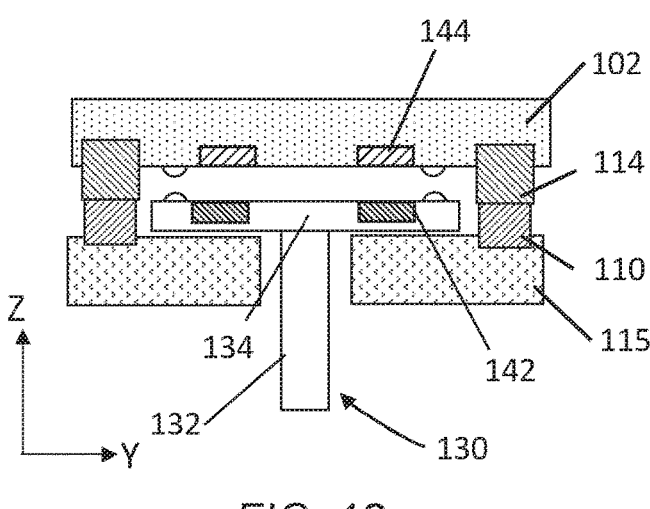
FIGS. 12 to 15 show schematic cross-sectional views of the different parts of the indexing and unlocking mechanisms according to alternative embodiments, in particular with different magnet arrangements.

FIG. 12 schematically illustrates an alternative embodiment in which the first magnet 140 is omitted such that the second member 104 is magnetically retained on the first member/mounting plate 102 by just a pair of magnets, i.e. the third magnet 144 provided on the first member/mounting plate 102 and the second magnet 142 provided on the contact plate 134 of the prop 132. Whilst this is possible, the second 142 and third 144 magnets need to provide all the locking/retaining force themselves, and so either one or both of them will need to be much stronger than the triple magnet arrangement described above, which then will require the motor to work much harder during the locking process when the prop's contact plate 134 is to be pulled away from the first member/mounting plate 102 (i.e. at the transition from FIG. 11*b* to FIG. 11*a*). Also, without the first magnet 140, all forces which retain the housing 105 of the second member 104 to the first member/mounting plate 102 have to be carried through the prop 130, lever 170, and lead screw mechanism 172 and associated bearings. This would require those parts to be bigger/stronger and would ideally need a motor which prevents back-driving.

Figures 13, 14:
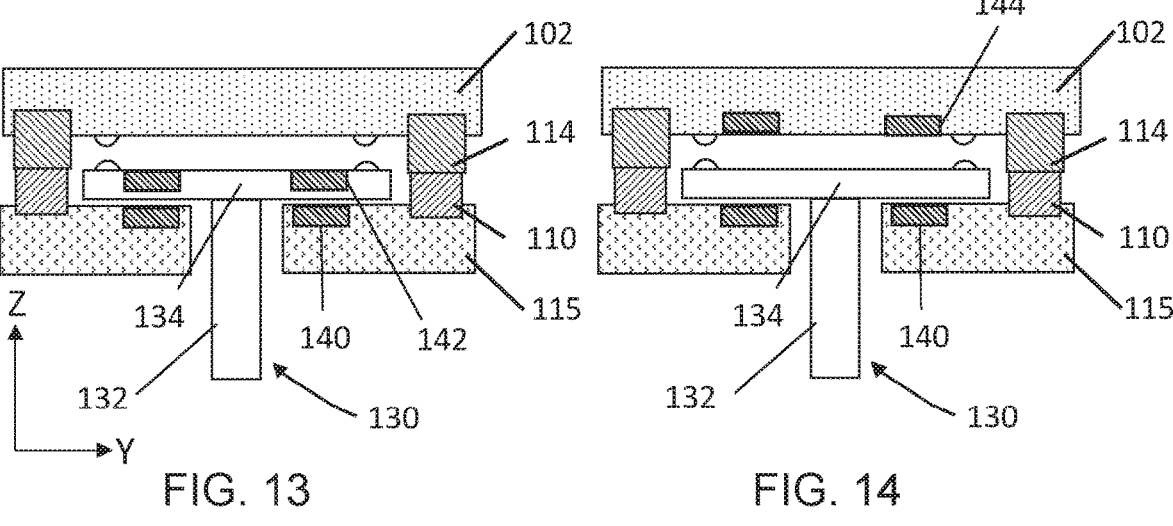

FIG. 13 illustrates another alternative embodiment in which the third magnet 144 is omitted such that the second member 104 is magnetically retained on the first member/mounting plate 102 by just a pair of magnets, i.e. the first magnet 140 provided on the housing's top plate 115 and the second magnet 142 provided on the prop's contact plate 134. In this case, the first member/mounting plate 102 (at least a part thereof) has to be made from material capable of being attracted by a magnet (e.g. ferrous material). A disadvantage of this embodiment is that the holding/retaining and break-out torques are lower compared to if the third magnet was present (and so bigger/stronger first 140 and/or second 142 magnets are required if the same holding/retaining and breakout torques are desired).

FIG. 14 illustrates another alternative embodiment in which the second magnet 144 is omitted such that the second member 104 is magnetically retained on the first member/mounting plate 102 by just a pair of magnets, i.e. the first magnet 140 provided on the housing's top plate 115 and the third magnet 144 provided on the first member/mounting plate 102. A disadvantage of this embodiment is that the holding/retaining and breakout torques are lower compared to if the second magnet was present (and so bigger/stronger first 140 and/or third 144 magnets are required if the same holding/retaining and breakout torques are desired). In this embodiment, the contact plate 134 could comprise material capable of being attracted by a magnet (e.g. ferrous material) so as to aid magnetic retention, but this is not as good as the contact plate 134 comprising a magnet.

Figure 15:
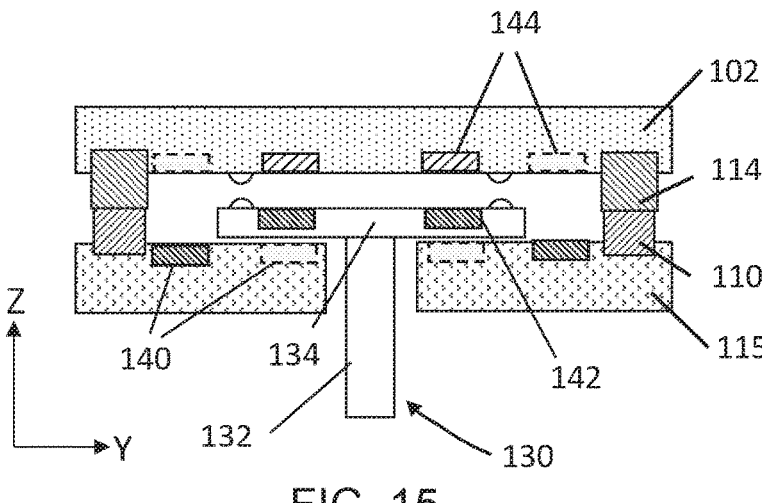

FIG. 15 illustrates another alternative embodiment. In this embodiment, it is illustrated that it is not essential for the magnets to be stacked directly such that they are in-line with each other. For example, FIG. 15 illustrates alternative locations of the first 140 and/or third 144 magnets 140, (e.g. they could be located radially further out than the second 142 magnet).

It is also possible for magnets to be used in an arrangement in which they repel each other in order to provide the necessary locking/retaining forces.

However, it has been found that the described arrangement of having at least three, in-line, stacked magnets, all arranged to attract each other, as per the embodiment of FIGS. 1 to 11, can be advantageous. In particular, it has been found to significantly reduce the work require of the motor which controls the linear position of the prop 130 when it is in its locked state, as well as can help to reduce the peak work required of the motor during the locking action. Not only can this reduce the size of the motor required and help to keep the articulated head compact and light, but it can also reduce the heat output of the motor (which in turn can improve the metrological performance of the articulated head by reducing/avoiding thermal distortions). Indeed, whilst the magnets of the embodiment of FIGS. 1 to 11 can be configured to provide 120N of pull force when locked and 160N when unlocked (so as to provide a 2 Nm breakout torque), due to the three, in-line, stacked magnets, the motor only needs to produce a peak 95N of force.

Figures 16, 17:
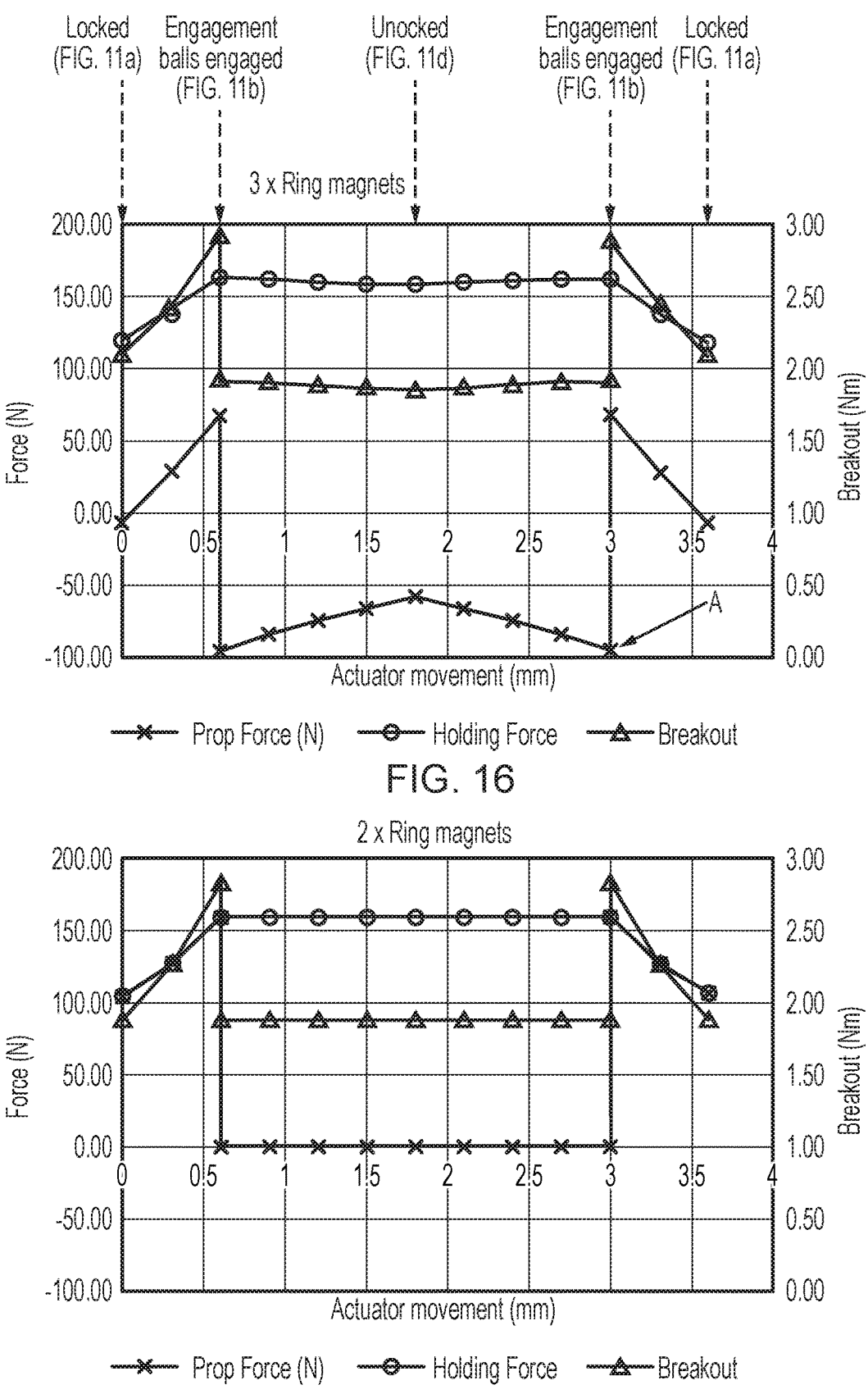
FIG. 16 is a graph illustrating the prop force and holding force for the three ring-magnet embodiment of FIGS. 3, 4 and 11.
FIG. 17 is a graph illustrating the prop force and holding force for the two ring-magnet embodiment of FIG. 12.

FIG. 16 is a graph illustrating the prop force and holding force for the three magnet embodiment of FIGS. 3, 4 and 11 and FIG. 17 is a graph illustrating the prop force and holding force for the two magnet embodiment of FIG. 12 (which is equivalent in every aspect apart from that the first magnet 140 has been omitted). The holding force (also referring to above as the "retaining force" or "locking force") is net force which pulls the first member 102 and second member 104 together. The prop force is the net magnetic force experienced by/exerted on the prop 130. Accordingly, this is the magnetic force that has to be overcome in order to hold the prop 130 at position. Such force can be overcome by a combination of the force exerted on the prop by the motor and any friction in the gearing/motor/prop system (as will be understood, if friction in the gearing/motor/prop system is excluded, then the prop force is proportional to the work required of the motor; e.g. proportional to the motor current).

As shown in FIG. 16, when the first member/mounting plate 102 and second member 104 are in their locked state, the prop force is very low (less than ION). Accordingly, the force required to hold the prop 130 in position is low. Indeed, it is so low that depending on the gearing/motor/prop system, friction might be sufficient to hold the prop 130 in position (e.g. if it is highly resistant to back-driving). Accordingly, very little to zero motor power is required to hold the prop 130 in position. Furthermore, as described above, the configuration of FIGS. 1 to 11, is arranged such that in the locked position the prop 130 is positioned such that the magnetic force biasing the second magnet 142 toward the first magnet 140 is greater than the magnetic force biasing the second magnet 142 toward the third magnet 144. Accordingly, even if the motor controlling the linear position of the prop 130 was turned off, and even if friction is not sufficient to hold the prop 130 in place against the magnetic bias, all that will happen is that the prop 130 will retract further until the contact plate 134 abuts the housing top face 115, which will have no detrimental impact on the engagement of the teeth 112, 118 of the first member/mounting plate 102 and second member 104.

This is to be contrasted with the prop force experienced by the prop 130 in the two-magnet embodiment of FIG. 12. As illustrated in FIG. 17, when in the locked state (which is the stated illustrated in FIG. 12), there is a significant net magnetic force which is biasing the second 142 magnet toward the third magnet 144 (about 110N). Accordingly, in the locked position, significant work/power is required of the motor to hold the prop 130 in position. Indeed, the prop force is so great that even the friction of the lead-screw mechanism which is highly resistant to back-driving is not sufficient to overcome the prop force and so if the motor was powered off the prop 130 would creep toward the first member/mounting plate 102 until they come into contact which would then interfere with the engagement of the teeth 112, 118 of the first member/mounting plate 102 and second member 104.

As can be seen from the graphs in FIGS. 16 and 17, there is some disadvantage to the three-magnet embodiment, in that there is significant prop force when the prop 130 and the first member/mounting plate 102 are engaged. Accordingly, significant motor work/power is required to push against the prop force so as to separate the first member/mounting plate 102 and the second body 104 (e.g. between the states shown in FIGS. 11b and 11d), and also to hold the first member/mounting plate 102 and the second body 104 in their unlocked state (e.g. in the state shown in FIG. 11d). In contrast, with the two-magnet embodiment of FIG. 12, there is zero prop force so very little motor work/power is required to separate the first member/mounting plate 102 and the second body 104 once the prop 130 and the first member/mounting plate 102 have engaged.

However, under normal circumstances, the amount of time that the articulated head spends in its unlocked state is significantly less than the amount of time that the articulated head spends in its locked state, and so the benefit of the three-magnet embodiment needing significantly less (or even zero) motor power in the locked state outweighs the cost of needing to work harder in the unlocked state.

The three-magnet embodiment of FIGS. 1 to 11 also has the benefit that the peak motor work/power required of it is less than that of the two-magnet embodiment. In the two-magnet embodiment, the greatest amount of work required of the motor is when it is re-locking the first member/ mounting plate 102 and the second body 104, and in particular the peak motor work/power is required at the point the teeth 112, 118 of the first member/mounting plate 102 and the second body 104 engage and the motor is trying to separate the prop's contact plate 134 and the first member/ mounting plate 102. At this point, the motor has to overcome the attractive pull of second 142 and third 144 magnets all by itself (as well as overcome any friction in the gearing/ motor/prop system), and so needs to exert a force greater than 150N. In contrast, with the three-magnet embodiment, at the point the teeth 112, 118 of the first member/mounting plate 102 and the second body 104 engage and the motor is trying to separate the prop's contact plate 134 and the first member/mounting plate 102 during a locking operation (i.e. at point represented by FIG. 11_b_), the first 140 and second 142 magnet have been brought closer together (compared to when they were fully unlocked as shown in FIG. 11_d_). Accordingly, the first magnet 140 is close enough to the second magnet 142 to exert a significantly amount of pull on the second magnet 142 and so assists the motor in separating the separate the prop's contact plate 134 and the first member/mounting plate 102. This results in the motor only needing to exert about 95N to effect such separation (see point A in FIG. 16).

As will be understood, alternative means could be provided for retaining the first member/mounting plate 102 and second member 104. For example, one or more mechanical rods (such as those described in U.S. Pat. No. 7,213,344) could be used to pull the housing 105 of the second member 104 and the first member/mounting plate 102 together. Alternatively, mechanical springs could be used to pull the housing 105 of the second member 104 and the first member/mounting plate 102 together. However, it has been found that magnets can be preferred over such mechanical solutions due to possible issues with hysteresis caused by friction (magnets can avoid the need for any moving parts between the first member/mounting plate 102 and the second member 104).

Figure 18:
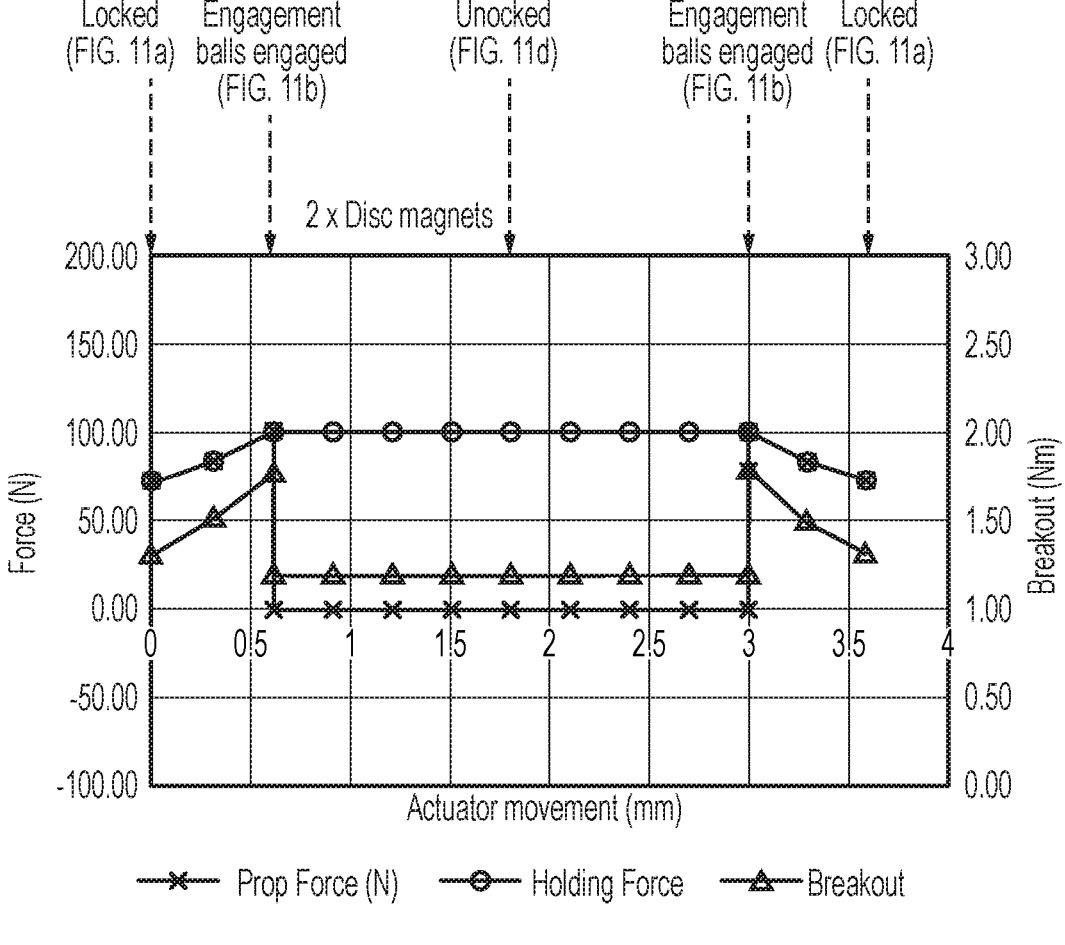
FIG. 18 is a graph illustrating the prop force and breakout torque for a two disc-magnet embodiment.

Advantageously, the above embodiment rely on the use of ring magnets. It is possible that one or more of the ring magnets could be replaced by disc magnets, but, somewhat counterintuitively, the inventors have identified that ring magnets have a substantially different force/distance profile compared to disc magnets which can be significantly advantageous in the present situation (and in particular ring magnets appear to provide a more efficient design for a given surface area compared to disc magnets). Indeed, it has been found that in this configuration, ring magnets can provide a much greater force (around 50% more) than a disc magnet of the same outer diameter and depth (measured orthogonal to the diameter of the ring). FIG. 18 is a graph illustrating the prop force and breakout torque for a two disc-magnet embodiment, which is equivalent in every aspect to that shown in FIG. 12 apart from that the second 142 and third 144 magnets are disc magnets instead of ring (wherein the outer-diameter of the disc magnets are the same as the outer-diameter of the ring magnets). As shown, the prop force, and crucially the breakout torque, is significantly less than the equivalent ring-magnet embodiment.

This finding has enabled them to provide the articulated head with a very high retaining/locking force which in turn enables higher loads/higher moments to be carried by the articulated head before the magnetic coupling fails. For example, it might be desirable to carry very heavy probes such as camera/video probes and/or it might be desirable to carry very long stylus which provide a large moment on the magnetic coupling, especially during probing. The need for such large forces has in the past pushed designers of articulated heads which are suitable for carrying large loads/ moments, away from the use of magnets. For example, the articulated heads disclosed in U.S. Pat. Nos. 7,263,780 and 9,494,403 use mechanical rods to provide the locking force. However, the inventors found that the use of ring magnets can provide a suitably large retaining load without needing physically large magnets and therefore can be fitted appropriately into an articulated head which is to be mounted onto a positioning apparatus such as a CMM.

As an alternative to continuous ring magnets, a series of small disc magnets arranged in a ring shape can provide advantages over a single disc magnet having the same diameter as the ring shape, but it has been found that a continuous ring provides the most efficient design (for a given surface area).

As described above, the planar teeth 112 of the first annular member/face spline member 110 and the crowned teeth 118 of the second annular member 114 provide for stable and repeatable positioning of the first member/mounting plate 102 and the second member 104. When in the locked state, the only physical/mechanical constraints between the first member/face spline member 102 and the second member 104 are the points of contact between planar teeth 112 of the first annular member/face spline member 110 and the crowned teeth 118 of the second annular member 114. It is a particular advantage of this configuration that at each of the indexed positions, the second member 104 is constrained in all six degrees of freedom with respect to the first member/mounting plate 102 by the six points of contact provided by the crowned teeth 118 of the second annular member 114 and the planar teeth 112 of the first annular member/face spline member 110, thereby providing a kinematic constraint. This is true for each of the possible indexed positions. This provides for maximum positional repeatability of a probe 300 mounted on the articulated head 100 at each indexed position. It is also advantageous that the face spline member 110 and second annular member 114 have the dual function of being both indexing elements and retaining elements.

As can be seen in FIGS. 3 and 4 a safety catch 136 or "pin" is provided. The safety catch 136 is provided merely to act as a safety mechanism to prevent complete detachment of the first 102 and second 104 members should the magnetic retaining mechanism fail (e.g. due to overloading of the second member 104, for instance due to a crash). One end of the safety catch 136 is secured to the prop's contact plate 134 and the other "head" end sits loose within a void 138 in the first member/mounting plate 102. Due to it sitting loose with a void in the first member/mounting plate 102, it does not act as a constraint between the first member/ mounting plate 102 and the prop 130/the second member 104 (and therefore does not interfere with the above described kinematic coupling of the first member/mounting plate 102 and the second member 104 when in the locked configuration, nor interfere with the kinematic coupling of the first member/mounting plate 102 and the prop 130 when in the unlocked configuration). However, the safety catch 136 has an enlarged head member 137 which in the event of a failure of the magnetic coupling between the second 142 and third 144 magnetic rings, will engage a ledge 139 in the void, thereby preventing further separation of the first member/mounting plate 102 and the second member 104.

In the embodiments described above, the face spline member 110 is provided on the articulated head's second member 104, and the crowned teeth 118 are provided on the first member/mounting plate 102. However, this need not necessarily be the case and they could be provided the other way around.

In the embodiments described above, the first member/ mounting plate 102 and second member 104 are magnetically retained, via an arrangement of magnets which has meant that it is not necessary to use a mechanical means (e.g. arms/levers) for pulling and holding the first member/ mounting plate 102 and the second member 104 together. Accordingly, when in the locked state, the only mechanical constraint between the first member/mounting plate 102 and second member 104 is provided by the teeth of the face spline member 110 and the teeth of the second annular member 114. Therefore, when in the locked configuration, the prop 130 is decoupled from the first member/mounting plate 102 such that the prop 130 does not interfere with the above described kinematic coupling of the first member/ mounting plate 102 and the second member 104. However, this need not necessarily be the case. For instance, in other embodiments, a mechanical push/pull lever arm mechanism could be provided, wherein one end of the arm is encapsulated within a bearing of the first member/mounting plate 102 and the other end of the arm is encapsulated within a bearing of the second member 104.

In the embodiments described above, the first member/ mounting plate 102 and second member 104 are magnetically retained, via an arrangement of magnets which has meant that it is not necessary to use a mechanical means (e.g. arms/levers) for pulling and holding the first member/ mounting plate 102 and the second member 104 together. Accordingly, when in the locked state, the only mechanical constraint between the first member/mounting plate 102 and second member 104 is provided by the face gear member 110 and second annular member 114. Accordingly, when in the locked configuration, the prop 130 is decoupled from the first member/mounting plate 102 such that the prop 130 does not interfere with the above described kinematic coupling of the first member/mounting plate 102 and the second member 104. However, this need not necessarily be the case. For instance, in other embodiments, a mechanical push/pull lever arm mechanism could be provided, wherein one end of the arm is encapsulated within a bearing of the first member/ mounting plate 102 and the other end of the arm is encapsulated within a bearing of the second member 104.

The invention claimed is:

1. A metrology apparatus comprising an indexed articulated joint comprising:
    first and second relatively reorientable bodies, respectively having mutually engageable engagement elements, which can be locked together in a plurality of different angular orientations about a first axis so as to provide for a plurality of angularly indexed positions of the first and second bodies;
    at least one verification sensor configured to provide a measure of the relative spatial configuration of first and second bodies when in their locked state, and
    wherein the apparatus is configured such that in the event of the first and second bodies locking together at an indexed position, the verification sensor is used to measure the relative spatial configuration of the first and second bodies, and wherein information obtained from said measure is compared to calibration information which was obtained from at least one other measure of the relative spatial configuration of the first and second bodies when the first and second bodies were locked at said indexed position at an earlier point in time, in order to establish information about the state of engagement of the first and second bodies.

2. An apparatus as claimed in claim 1, configured to react in a predetermined manner depending on the outcome of the aforementioned comparison.

3. An apparatus as claimed in claim 2, in which said reacting in a predetermined manner comprises causing the first and second bodies to unlock and relock at the same indexed position.

4. An apparatus as claimed in claim 3, which is configured to cause the first and second bodies to unlock and relock at the same indexed position if the comparison indicates that the current relative spatial configuration of the first and second bodies in the indexed position differs from a relative spatial configuration of the first and second bodies represented by the calibration information, by more than a predetermined threshold.

5. An apparatus as claimed in claim 4, in which the predetermined threshold is not more than 20 $\mu$m.

6. An apparatus as claimed in claim 1, in which the verification sensor comprises an encoder apparatus comprising a rotary scale provided on one of the first and second bodies, and at least one first readhead provided on the other of the first and second bodies to read the rotary scale.

7. An apparatus as claimed in claim 6, in which the verification sensor's encoder apparatus comprises a second readhead configured to read the scale.

8. An apparatus as claimed in claim 7, in which the second readhead is configured to read the scale at a location 90° apart from the location at which the at least one first readhead reads the scale.

9. An apparatus as claimed in claim 6, in which the verification sensor's encoder apparatus comprises an incremental encoder apparatus comprising an incremental scale having a series of periodic scale features.

10. An apparatus as claimed in claim 6, in which the verification sensor's encoder apparatus comprises an optical encoder apparatus.

11. An apparatus as claimed in claim 1, further comprising a motor for driving the first and second bodies about the first axis when unlocked.

12. An apparatus as claimed in claim 1, further comprising a primary encoder apparatus configured to monitor the relative rotational position of the first and second bodies about the first axis when unlocked.

13. An apparatus claimed in claim 1, in which the first body comprises a rotatable member which is configured to engage and be rotationally fixed relative to the second body when the first and second bodies are unlocked and rotated relative to each other.

14. An apparatus as claimed in claim 12, in which the primary encoder apparatus comprises a readhead on one of the first body and the member, and a scale on the other, such that the readhead provides a measurement of the relative rotational position of the first body and the member.

15. An apparatus as claimed in claim 12, configured to control the rotation of the first and second bodies when unlocked using the output of the primary encoder apparatus.

16. An apparatus as claimed in claim 1, in which the calibration information is stored in a look-up table.

17. An apparatus as claimed in claim 1, in which the calibration information is obtained from at least one other measure of the relative spatial configuration of the first and second bodies obtained by the verification sensor.

18. An apparatus as claimed in claim 1, in which the information obtained from said measure, is the current measure obtained by the verification sensor.

19. An apparatus as claimed in claim 18, in which the calibration information is a measure obtained by the verification sensor when the first and second bodies were locked at said indexed position at an earlier point in time.

20. An apparatus as claimed in claim 1, in which the apparatus comprises a probe head comprising the indexed articulated joint, the probe head being configured to support a measurement probe on a coordinate positioning apparatus such that the measurement probe can be arranged at a plurality of different indexed rotational orientations.

21. An apparatus as claimed in claim 1, comprising a memory device comprising the calibration information.

22. An apparatus as claimed in claim 20, in which the probe head comprises the memory device.

23. A method of operating a metrology apparatus which comprises an indexed articulated joint comprising first and second bodies respectively having mutually engageable engagement elements, which can be locked together in a plurality of different angular orientations about a first axis so as to provide a plurality of angularly indexed positions at which the first and second bodies can be locked relative to each other, and at least one verification sensor configured to provide an output which is dependent on the relative spatial configuration of first and second bodies in their locked state, the method comprising;

causing the first and second bodies to lock together at an indexed position; taking a reading from the at least one verification sensor; and comparing i) information at least derived from the reading to ii) calibration information which was at least derived from at least one other reading of the relative spatial configuration of the first and second bodies obtained by the verification sensor when the first and second bodies were locked at said indexed position at an earlier point in time.

\* \* \* \* \*